US010241625B2

(12) United States Patent
Jeong et al.

(10) Patent No.: US 10,241,625 B2
(45) Date of Patent: Mar. 26, 2019

(54) DISPLAY DEVICE

(71) Applicant: LG ELECTRONICS INC., Seoul (KR)

(72) Inventors: Chansung Jeong, Seoul (KR); Dongjin Yoon, Seoul (KR); Sangtae Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/724,114

(22) Filed: Oct. 3, 2017

(65) Prior Publication Data

US 2019/0004668 A1    Jan. 3, 2019

Related U.S. Application Data

(60) Provisional application No. 62/537,940, filed on Jul. 27, 2017.

(30) Foreign Application Priority Data

Jun. 8, 2017    (KR) .................. 10-2017-0071639

(51) Int. Cl.
  *G06F 3/042*    (2006.01)
  *G01J 1/04*    (2006.01)
  *G01J 1/08*    (2006.01)
(52) U.S. Cl.
  CPC .......... *G06F 3/0428* (2013.01); *G01J 1/0411* (2013.01); *G01J 1/0488* (2013.01); *G01J 1/08* (2013.01)
(58) Field of Classification Search
  None
  See application file for complete search history.

(56) References Cited

U.S. PATENT DOCUMENTS

| 9,001,086 B1* | 4/2015 | Saini | G06F 3/0428 |
| | | | 345/175 |
| 2011/0090147 A1* | 4/2011 | Gervais | G06F 3/017 |
| | | | 345/157 |
| 2011/0141062 A1* | 6/2011 | Yu | G06F 3/0428 |
| | | | 345/175 |
| 2013/0257810 A1* | 10/2013 | Niu | G06F 3/0428 |
| | | | 345/175 |

FOREIGN PATENT DOCUMENTS

| JP | 2004303172 | 10/2004 |
| JP | 2013025330 | 2/2013 |
| KR | 1020110078684 | 7/2011 |

OTHER PUBLICATIONS

PCT International Application No. PCT/KR2017/013262, International Search Report dated Apr. 4, 2018, 3 pages.

* cited by examiner

*Primary Examiner* — Nicholas J Lee
(74) *Attorney, Agent, or Firm* — Lee, Hong, Degerman, Kang & Waimey PC

(57) ABSTRACT

A display device is disclosed. The display device of present invention comprises a display panel; a light transmitting panel positioned at a front of the display panel, the light transmitting panel including a first edge and a second edge opposite to the first edge; a back cover positioned at a rear of the display panel; and a sensor unit adjacent to a lateral side of the display panel. The sensor unit includes a frame and a optical transmitter and a optical receiver. The optical transmitter includes a optical assembly and a optical bender.

18 Claims, 30 Drawing Sheets

| | NA | Receiver D | LED~receiver distance f | Sinθ θ | Actually available LED~receiver distance 2θ |
|---|---|---|---|---|---|
| Existing IR spread | 0.44 | 7 | 7 | 26° | 52° |
| First improved IR spread | 0.11 | 3.5 | 15 | 6.6° | 13° |
| Second improved IR spread | 0.26 | 3.5 | 6.3 | 15.5° | 31° |

※ A theoretically calculated NA of IR optical system

DISPLAY DEVICE

Pursuant to 35 U.S.C. § 119(a), this application claims the benefit of earlier filing date and right of priority to Korean Patent Application No. 10-2017-0071639, filed on Jun. 8, 2017, the contents of which are hereby incorporated by reference herein in its entirety.

BACKGROUND OF THE INVENTION

Field of the Invention

This invention is related to a display device, especially the display device including a touch screen using optical sensor.

Discussion of the Related Art

As the information society advances, the demand for display devices is increasing in various forms. The display can be implemented using a method such as an LCD (Liquid Crystal Display Device), a PDP (Plasma Display Panel), an ELD (Electroluminescent Display), a VFD (Vacuum Fluorescent Display), an OLED (Organic Light Emitting Diode).

In recent years, research has been conducted on an electronic blackboard that not only displays a screen but also displays a touch on the screen. The electronic blackboard can be designed not only to display an image, but also to display a user's touch trajectory.

A display device having the function of the blackboard may have a large screen tendency in accordance with the large screen tendency of the prior display device. Even if the screen of the display device having the function of the electronic blackboard becomes large, studies are being conducted to efficiently acquire the user's touch trajectory.

SUMMARY OF THE INVENTION

Accordingly, an object of the present disclosure is to address the above-described and other problems.

Another object of the present invention is to provide a display device including an optical assembly and an optical sensor disposed along an edge of a display panel and sensing a user's touch.

Another object of the present invention is to provide a display device of which the optical assembly and the optical sensor have a thickness corresponding to the thickness of the display panel.

Another object of the present invention is to provide a display device including a light bender for bending the light provided from the optical assembly and advancing the light in parallel with the display panel.

Another object of the present invention is to provide a display device including a lens using internal total reflection.

According to an aspect of the present invention, there is provided a display device comprising: a display panel; a light transmitting panel positioned at a front of the display panel, the light transmitting panel including a first edge and a second edge opposite to the first edge; a back cover positioned at a rear of the display panel; and a sensor unit adjacent to a lateral side of the display panel, wherein the sensor unit includes: a frame having a first part and a second part, the first part covering the first edge of the light transmitting panel, the second part covering the second edge of the light transmitting panel; a optical transmitter positioned between the first edge of the light transmitting panel and the first part of the frame, the optical transmitter providing light; and a optical receiver positioned between the second edge of the light transmitting panel and the second part of the frame, the optical receiver sensing the light from the light transmitter, wherein the optical transmitter includes: a optical assembly providing the light; and an optical bender facing the light assembly and optical receiver.

According to another aspect of the present invention, the optical bender of the optical transmitter may be a first optical bender, and the optical receiver may include: a optical sensor sensing the light; and a second optical bender facing the optical sensor and the first optical bender.

According to another aspect of the present invention, the frame may include: a first receiving portion accommodating the optical assembly; a second receiving portion accommodating the optical bender, the second receiving portion positioned at a rear of the first receiving portion, the second receiving portion extended from the first receiving portion; and a third receiving portion extended from the second receiving portion, the third receiving portion opened toward the second edge of the light transmitting panel.

According to another aspect of the present invention, the second receiving portion may include a second receiving portion facing part, and the optical bender may include a reflective panel coupled with the second receiving portion facing part, and the reflective panel may reflect the light from the optical assembly toward the third receiving portion.

According to another aspect of the present invention, the optical bender may include a reflective lens, and the reflective lens may reflect at least a portion of light incident inside of the reflective lens by an action of total internal reflection.

According to another aspect of the present invention, the reflective lens may include: an incident surface facing the optical assembly; an ejecting surface extended from an end of the incident surface, the ejecting surface facing the third receiving portion; and a reflection surface extended from another end of the incident surface to the ejecting surface.

According to another aspect of the present invention, the reflection surface may include: a reflection surface extension extended from the incident surface; and a reflection surface reflecting portion bent and extended from the reflection surface extension, the reflection surface reflecting portion connected to the ejecting surface.

According to another aspect of the present invention, the reflection surface reflecting portion may be bent and extended toward the third receiving portion from the reflection surface reflecting portion.

According to another aspect of the present invention, the ejecting surface may include a ejecting surface convex portion, and the ejecting surface convex portion may be convex from the inside of the reflective lens toward an outside of the reflective lens.

According to another aspect of the present invention, the ejecting surface convex portion may face the third receiving portion.

According to another aspect of the present invention, the ejecting surface may include a ejecting surface concave portion extended from the ejecting surface convex portion to the incident surface.

According to another aspect of the present invention, the ejecting surface concave portion may be concave from the inside of the reflective lens toward the outside of the reflective lens.

According to another aspect of the present invention, the second receiving portion may include: a second receiving portion facing part, facing the reflection surface of the reflective lens; and a second receiving portion shielding part, extended from the second receiving portion facing part to the third receiving portion, recessed toward an inside of the frame.

According to another aspect of the present invention, the second receiving portion facing part may be inclined with the incident surface.

According to another aspect of the present invention, the second receiving portion facing part may form a gap with the reflection surface, and the second receiving portion shielding part may be recessed with respect to the reflection surface.

According to another aspect of the present invention, the gap between the second receiving portion facing part and the reflection surface may be greater as it goes toward the third receiving portion.

According to another aspect of the present invention, the frame may include a light absorbing substance applied on the second receiving portion.

According to another aspect of the present invention, the optical assembly may include: a optical PCB accommodated in the first receiving portion; and a light source coupled with the optical PCB, the light source providing the reflective lens with the light.

According to another aspect of the present invention, the optical PCB includes: a optical PCB body accommodated in the first receiving portion; and a optical PCB coupling portion protruding from a surface of the optical PCB body; and a optical PCB facing portion formed on the optical PCB coupling portion, the optical PCB facing portion facing the reflective lens, the light source may be mounted on the optical PCB facing portion.

According to another aspect of the present invention, the light source may include a plurality of light sources, the optical PCB facing portion may include a plurality of optical PCB facing portions corresponding to the plurality of light sources, and at least a portion of the plurality of optical PCB facing portions may form inclination with respect to the incident surface of the reflective lens.

According to at least one of the embodiments of the present invention, the optical assembly and the optical sensor may be disposed along the edge of the display panel, the optical assembly and the optical sensor detecting user's touch.

According to at least one of the embodiments of the present invention, the optical assembly and the optical sensor have a thickness corresponding to the thickness of the display panel.

According to at least one of the embodiments of the present invention, the light bender may bend the light provided from the optical assembly and advance the light in parallel with the display panel.

According to at least one of the embodiments of the present invention, the light bender may bend the light using internal total reflection.

According to at least one of the embodiments of the present invention, the light bender may collimate the bent light.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
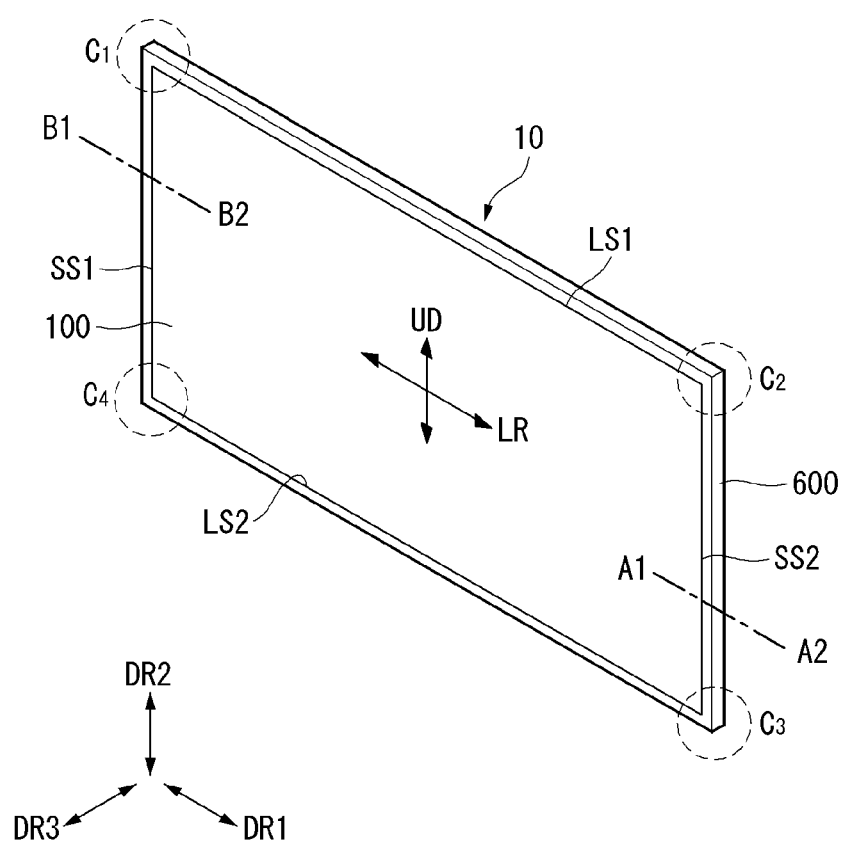
FIG. 1 is a perspective view showing a display device according to an embodiment of the present invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Referring to FIG. 1, the display device may include a first long side LS1, a second long side LS2, a first short side SS1, and a second short side SS2. The second long side LS2 may be opposite to the first long side LS1. The first short side SS1 may be adjacent to an end of the first long side LS1 and an end of the second long side LS2. The second short side SS2 may be opposite to the first short side SS1.

The first short side SS1 may be referred to as a first side area. The second short side SS2 may be referred to as a second side area. The first long side LS1 may be referred to as a third side area. The second long side LS2 may be referred to as a fourth side area.

Although the length of the long sides LS1 and LS2 are longer than the length of the short sides SS1 and SS2 in accordance with the convenience of explanation, it is also possible that the length of the long sides LS1 and LS2 is substantially equal to the length of the short sides SS1 and SS2.

The first direction DR1 may be parallel to the long sides LS1 and LS2 of the display device and the second direction DR2 may be parallel to the short sides SS1 and SS2 of the display device.

The third direction DR3 may be perpendicular to the first direction DR1 or/and the second direction DR2.

The first direction DR1 and the second direction DR2 may be referred to as a horizontal direction. The third direction may a vertical direction.

From another point of view, the side on which the display device 10 displays an image may be referred to as a front or a front side. When the display device 10 displays an image, the side on which the image cannot be observed may be referred to as a rear or a rear side. When the display device 10 is viewed from the front or the front side, the first long side LS1 may be referred to as the upper or the upper side, the second long side LS2 may be referred to as a lower or a lower side, the first short side SS1 may be referred to as the left or the left side, and the second short side SS2 may be referred to as the right or the right side.

The first long side LS1, the second long side LS2, the first short side SS1, and the second short side SS2 may be referred to as an edge of the display device 10. A place where the first long side LS1, the second long side LS2, the first short side SS1, and the second short side SS2 meet with each other may be referred to as a corner. For example, a place where the first long side LS1 and the first short side SS1 meet may be a first corner C1. A place where the first long side LS1 and the second short side SS2 meet may be a second corner C2. A place where the second short side SS2 meets the second long side LS2 may be a third corner C3. A place where the second long side LS2 and the first short side SS1 meet may be a fourth corner C4.

The direction from the first short side SS1 to the second short side SS2 or the direction from the second short side SS2 to the first short side SS1 can be referred to as the left-right direction LR. The direction from the first long side LS1 to the second long side LS2 or the direction from the second long side LS2 to the first long side LS1 may be referred to as the up-down direction UD.

The display device 10 may include a display panel 100 and a sensor unit 600.

The display panel 100 may be provided on the front surface of the display device 10 and display images. The display panel 100 divides an image into a plurality of pixels, and outputs an image by adjusting color, brightness, and saturation of each pixel.

The display panel 100 may be an organic light emitting diode (OLED) panel. The display panel 100 may be a liquid crystal display (LCD) panel.

The sensor unit 600 may be positioned adjacent to each side of the display panel 100. The sensor unit 600 can acquire a touch input applied to the front surface of the display device 10. The display device 10 can display an output image corresponding to the touch input obtained by the sensor unit 600 on the display panel 100. For example, the display device 10 can display the touch trajectory obtained from the sensor unit 600 on the display panel 100. The touch on the display panel 100 may comprise close approach to the display panel 100 to an extent that the sensor unit 600 can detect.

Figure 2:
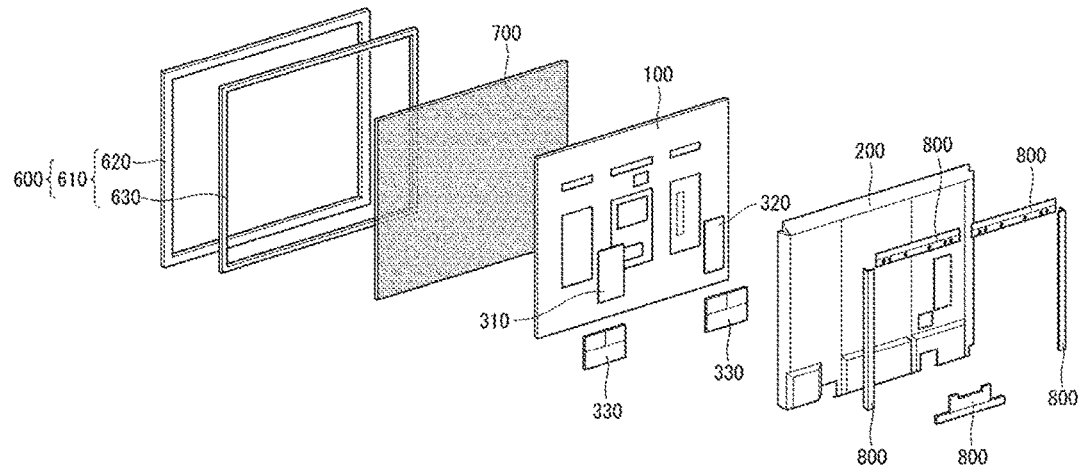
FIG. 2 is a exploded view of the display device according to an embodiment of the present invention.

Referring to FIG. 2, the back cover 200 may be positioned at a rear of the display panel 100. The back cover 200 may be attached to the display panel 100 by using an adhesive sheet. The back cover 200 may support the rear surface of the display panel 100. The back cover 200 may reinforce the rigidity of the display panel 100. The back cover 200 may include a high strength material. For example, the back cover 200 may comprise aluminum.

The protective panel 700 may be positioned at a front of the display panel 100. The protective panel 700 may face the display panel 100. The protective panel 700 can pass an image displayed on the display panel 100. The protective panel 700 can protect the display panel 100 from pressure caused by a user's touch. The protective panel 700 may be referred to as a light transmitting panel 700. The protective panel 700 may be referred to as a transparent panel 700. The protective panel 700 may be in the form of a plate or a film.

The frame 610 of the sensor unit 600 may be located on a lateral side surface of the protective panel 700. The frame 610 of the sensor unit 600 may have a shape that surrounds the lateral side of the protective panel 700. The frame 610 of the sensor unit 600 may form the appearance of the sensor unit 600. The frame 610 of the sensor unit 600 may form a skeleton of the sensor unit 600. The frame 610 of the sensor unit 600 may include an outer frame 620 and an inner frame 630.

The outer frame 620 may form an outer appearance of the sensor unit 600. The outer frame 620 may form the skeleton of the sensor unit 600. The outer frame 620 may secure rigidity.

The inner frame 630 may correspond to the shape of the outer frame 620. The inner frame 630 may be fastened to the outer frame 620. The inner frame 630 may accommodate a component for acquiring a touch input. The inner frame 630 may be connected to the protective panel 700. The inner frame 630 may be disposed between the protective panel 700 and the outer frame 620.

The bracket 800 may couple the sensor unit 600 and the back cover 200. For example, the bracket 800 may couple the frame 610 and the back cover 200. A lengthwise direction of the bracket 800 may be along an edge of the display panel 100. The bracket 800 may be highly rigid. The bracket 800 may include a metal.

The power supply board 310 may be disposed between the display panel 100 and the back cover 200. The power supply board 310 may supply power to the display panel 100 and the sensor unit 600.

The main board 320 may be disposed between the display panel 100 and the back cover 200. The main board 320 may be electrically connected to the display panel 100 and the sensor unit 600. The main board 320 may obtain an electric signal from the sensor unit 600. The main board 320 may supply an electrical signal to the display panel 100. The electrical signal provided by the main board 320 to the display panel 100 may be related to an image or a video.

The speaker module 330 may be positioned at the rear of the display panel 100. The speaker module 330 may be electrically connected to the main board 320. The speaker module 330 may receive audio signals from the main board 320 and may provide sound.

Various boards may be disposed on the rear surface of the display panel 100. For example, a source PCB, a timing controller board (T-con board), an interface PCB, and the like may be disposed on the rear surface of the display panel 100. The timing controller board can process electrical signals related to graphics. The timing controller board may be electrically connected to the main board 320. The interface PCB may be wired to the outside or wirelessly connected. For example, the interface PCB may include a Wi-Fi board that can communicate wirelessly with the outside.

Figure 3:
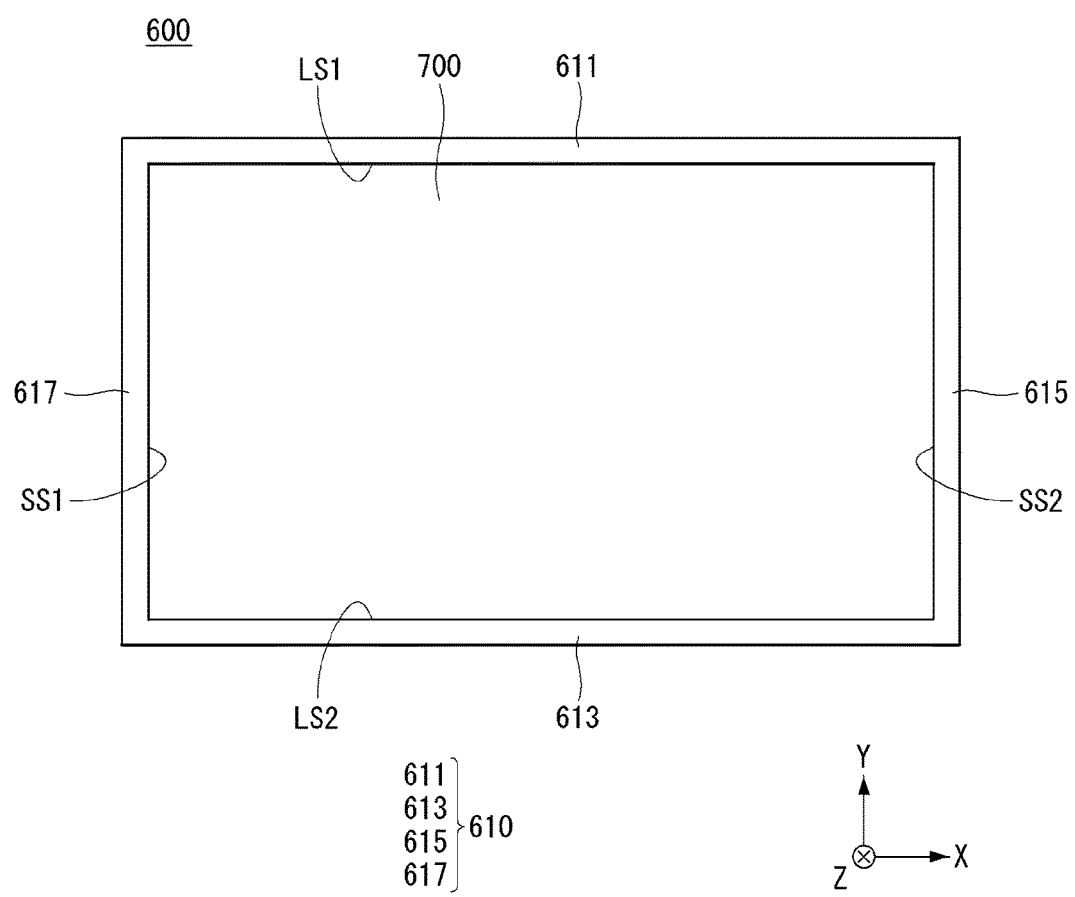
FIGS. 3 and 4 are front views showing a display device according to an embodiment of the present invention.

Referring to FIG. 3, the sensor unit 600 may include a frame 610 that forms an appearance. The frame 610 may have the shape of the photo frame as a whole. The frame 610 may include a first frame 611, a second frame 613, a third frame 615, and a fourth frame 617.

The first long side LS1 of the light transmitting panel 700 may be referred to as the first side LS1 of the light transmitting panel 700. The side of the light transmitting panel 700 opposite to the first side LS1 may be referred to as the second side LS2 of the light transmitting panel 700. The second long side LS2 of the light transmitting panel 700 may be referred to as the second side LS2 of the light transmitting panel 700.

The second short side SS2 of the light transmitting panel 700 may be referred to as the third side SS2 of the light transmitting panel 700. The side of the light transmitting panel 700 opposite to the third side SS2 may be referred to as the fourth side SS1 of the light transmitting panel 700. The first short side SS1 of the light transmitting panel 700 may be referred to as the fourth side SS1 of the light transmitting panel 700.

The first frame 611 may accommodate a sensing component that acquires a touch input. For example, the first frame 611 may accommodate an optical assembly that generates light. The wavelength of light generated by the optical assembly may include wavelengths in the infrared range.

The first frame 611 may be referred to as a first portion 611 of the frame 610. The first portion 611 of the frame 610 may cover the first side LS1 of the light transmitting panel 700. The first portion 611 of the frame 610 may be elongated along the first side LS1 of the light transmitting panel 700.

The second frame 613 may be positioned opposite to the first frame 611. The second frame 613 may be corresponded to the first frame 611. The second frame 613 may be elongated along the second side LS2 of the light transmitting panel 700. The second frame 613 may accommodate a sensing component for acquiring a touch input. For instance, the second frame 613 may accommodate an optical receiver.

The second frame 613 may be referred to as a second portion 613 of the frame 610. The second portion 613 of the frame 610 may cover the second side LS2 of the light transmitting panel 700.

The third frame 615 may be elongated along the third side SS2 of the light transmitting panel 700. The third frame 615 may connect the first frame 611 and the second frame 613. The third frame 615 may accommodate an optical assembly that generates light.

The third frame 615 may be referred to as a third portion 615 of the frame 610. The third portion 615 of the frame 610 may cover the third side SS2 of the light transmitting panel 700.

The fourth frame 617 may be elongated along the fourth side SS1 of the light transmitting panel 700. The fourth frame 617 may connect the first frame 611 and the second frame 613. The fourth frame 617 may be positioned opposite to the third frame 615. The fourth frame 617 may accommodate an optical receiver.

The fourth frame 617 may be referred to as a fourth portion 617 of the frame 610. The fourth portion 617 of the frame 610 may cover the fourth side SS1 of the light transmitting panel 700.

Figure 4:
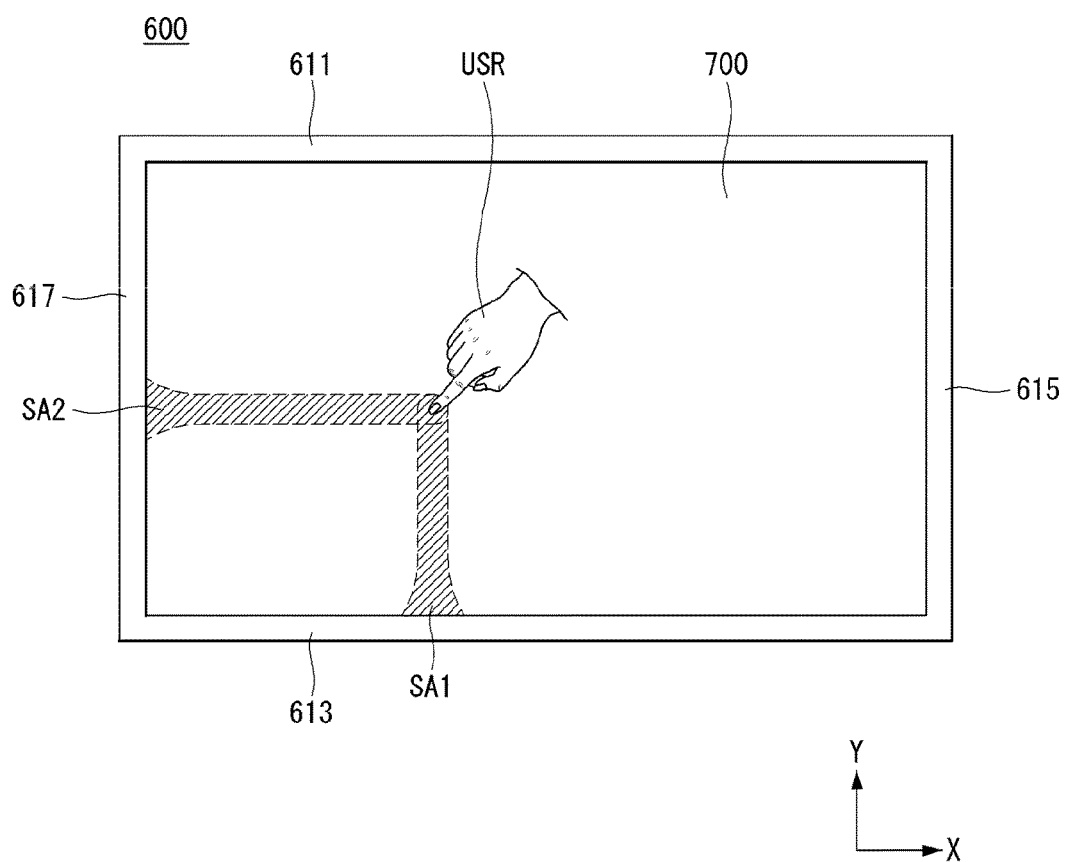

Referring to FIG. 4, the sensor unit 600 may acquire a touch input of the user USR. The touch of the user USR may be located between the first frame 611 and the second frame 613 and may be located between the third frame 615 and the fourth frame 617.

Light may propagate from the first frame 611 toward the second frame 613. Light traveling from the first frame 611 toward the second frame 613 may have uniformity over a certain level.

Light may propagate from the first frame 611 toward the second frame 613. Light traveling from the first frame 611 toward the second frame 613 may have uniformity over a certain level.

The touch input may be applied by the user USR. When the touch input is applied between the first frame 611 and the second frame 613, a first shadow area SA1 may be formed. When the touch input is applied between the third frame 615 and the fourth frame 617, a second shadow area SA2 may be formed.

The first shadow area SA1 may affect the distribution of light reaching the second frame 613. The optical receiver accommodated in the second frame 613 may sense the distribution of light by the first shadow area SA1.

The second shadow area SA2 may affect the distribution of light reaching the fourth frame 617. The optical receiver accommodated in the second frame 617 may sense the distribution of light by the second shadow area SA2.

The optical receivers placed in the second frame 613 and the fourth frame 617 may sense the distribution of light due to the shadow areas SA1 and SA2. The shadow areas SA1 and SA2 may correspond to a position of the touch input of the user USR. Accordingly, the optical sensors located in the second frame 613 and the fourth frame 617 may sense the position of the touch input of the user USR.

Figure 5:
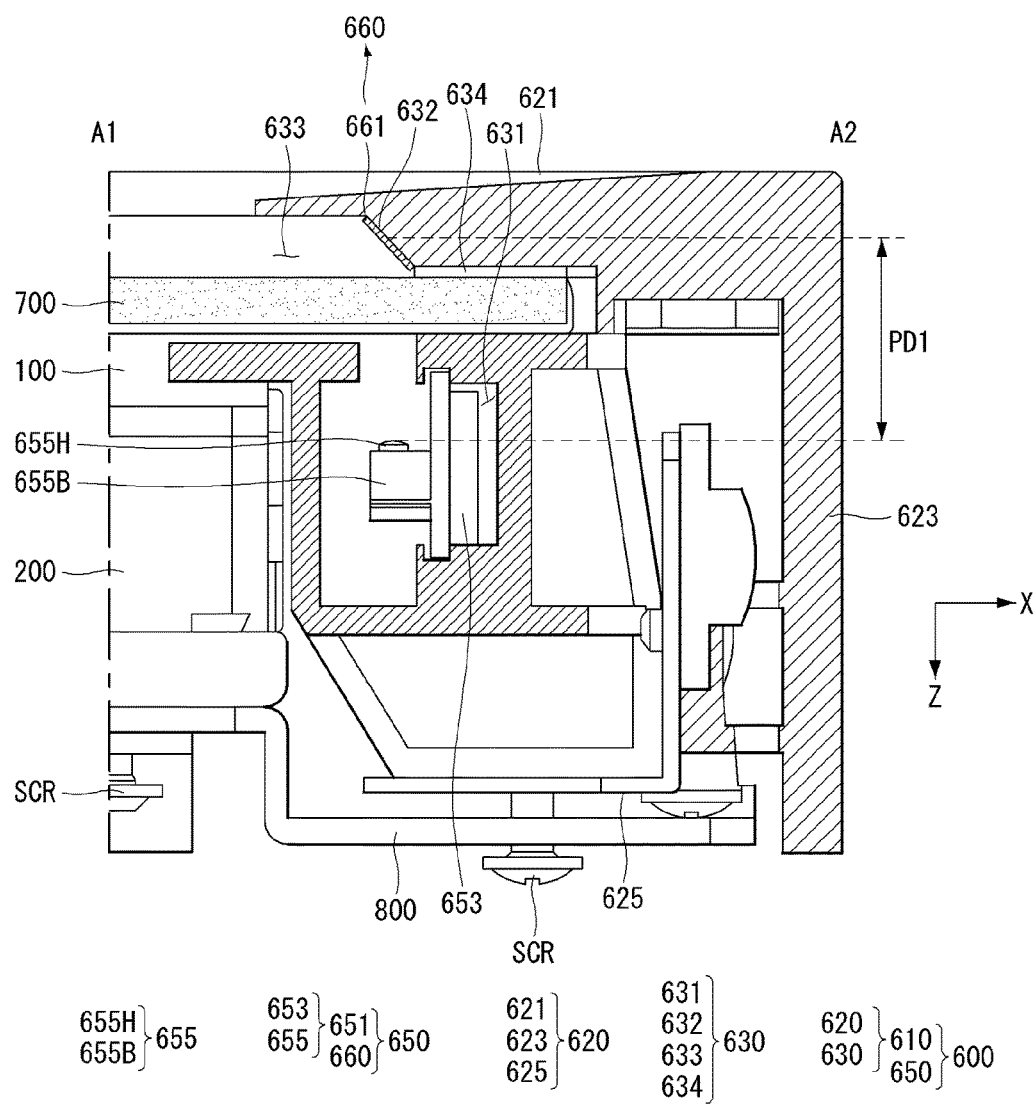
FIGS. 5 to 8 are views showing various embodiments of the optical transmitter, sectional views of the display device taken along the line A1-A2 in FIG. 1

Referring to FIG. 5, cross-section of the display device 10 taken along the line A1-A2 in FIG. 3 may be seen.

The frame 610 may form the appearance of the sensor unit 600. The frame 610 may include an outer frame 620 and an inner frame 630.

The outer frame 620 may include a front portion 621, a lateral portion 623, and a rear portion 625. The front portion 621 of the outer frame 620 may face the front of the display device 10. The rear portion 625 of the outer frame 620 may face the rear of the display device 10. The lateral portion 623 of the outer frame 620 may connect the front portion 621 of the outer frame 620 and the rear portion 625 of the outer frame 620. The lateral portion 623 of the outer frame 620 may face the side of the display device 10. The rear portion 625 of the outer frame 620 may face the bracket 800. The rear portion 625 of the outer frame 620 may be coupled with the bracket 800. For example, the rear portion 625 of the outer frame 620 and the bracket 800 may be fastened by a screw SCR.

The back cover 200 may be positioned on the rear of the display panel 100. The back cover 200 may be attached to the display panel 100. A bracket 800 may be connected to a rear of the back cover 200.

The brackets 800 may be located at a rear side of the display device 10. The bracket 800 may face the rear of the display device 10. The bracket 800 may couple the back cover 200 and the sensor unit 600. For example, the bracket 800 may fasten the back cover 200 and the frame 610.

The inner frame 630 may be fastened to the outer frame 620. The inner frame 630 may be positioned between the outer frame 620 and the display panel 100. The inner frame 630 may accommodate the optical transmitter 650. The inner frame 630 may form the first receiving portion 631, the second receiving portion 632, the third receiving portion 633, and the fourth receiving portion 634. The first receiving portion 631, the second receiving portion 632, and the third receiving portion 633 may communicate with each other. The second receiving portion 632 may be inclined toward the first receiving portion 631.

The optical transmitter 650 may transmit light to the outside of the frame 610. The optical transmitter 650 may include an optical assembly 651 and an optical bender 660.

The optical assembly 651 may be received in the inner frame 630. The optical assembly 651 may be installed at the inner frame 630. The optical assembly 651 may be received in the first receiving portion 631. The optical assembly 651 may generate light. The optical assembly 615 may generate a light beam. The optical assembly 651 may include an optical PCB 653 and a light source 655.

The optical PCB 653 may be received in the inner frame 630. The optical PCB 653 may be provided with external power and/or electrical signals. A light source 655 may be connected to the optical PCB 653. The optical PCB 653 may provide electrical signals and/or power to the light source 655.

The light source 655 may generate a light beam including a certain range of wavelengths. For example, the light source 655 may generate a light beam that includes a wavelength in the infrared range. The light generated by the light source 655 may have a certain range of angle of beam spread.

The light source 655 may include a light source body 655B and a light source head 655H. The light source body 655B may be coupled with the optical PCB 653. The light source body 655B may be provided with electrical and/or electrical signals from the optical PCB 653. The light source body 655B can determine the attitude of the light source 655. The light source body 655B may determine the direction of the light beam generated from the light source 655. The light source body 655B may be formed integrally with the optical PCB 653. The light source head 655H may be seated on the light source body 655B. The light source head 655H may be provided with electric power and/or electrical signals from the light source body 655B. The light source head 655H can generate a light beam. The light source head 655H may include a light emission display (LED). The light source 655 can generate a light beam in a direction from the light source body 655B toward the light source head 655H. For example, the light source 655 may generate a light beam in a direction toward the front of the display device 10.

The protective panel 700 may be positioned at the front of the display panel 100. The protective panel 700 may be connected to the frame 610. The protective panel 700 may be received in the fourth receiving portion 634. The protective panel 700 may be fastened to the frame 610. A portion of the protective panel 700 may be positioned between the optical assembly 651 and the optical bender 660. The light beams generated from the optical assembly 651 can pass through the protective panel 700. The protective panel 700 may weaken the intensity of the light beam compared to the air medium.

The optical bender 660 may be positioned in front of the protective panel 700. The optical bender 660 may be adjacent to the front portion 621 of the outer frame 620. The optical bender 660 may include a reflective panel 661. The reflective panel 661 may be received in the second receiving portion 632. The reflective panel 661 may have a reflectivity higher than a certain level. The reflective panel 661 may comprise a metal.

The distance between the reflective panel 661 and the light source 655 may be a first distance PD1. The first distance PD1 may be a propagated distance of the light from the light source 655 to the reflective panel 661.

The light beam generated from the light source 655 may go through the protective panel 700 and reach the reflective panel 661. The light beam generated from the light source 655 may have an angle of beam spread. When the first distance PD1 is increased, the intensity of the light beam reaching the reflective panel 661 may be reduced.

A light beam generated in the optical assembly 651 and passing through the protective panel 700 can travel toward the reflection panel 661. The light beam incident on the reflective panel 661 can travel in the direction from the light source 655 toward the reflective panel 661. The light beam incident on the reflective panel 661 may travel in a changed path. The light beam reflected by the reflective panel 661 may travel in a direction toward the display panel 100 from the frame 610. The light beam reflected by the reflective panel 661 may pass through the third receiving portion 633. The light beam reflected by the reflective panel 661 can travel in parallel with the protective panel 700.

Figure 6:
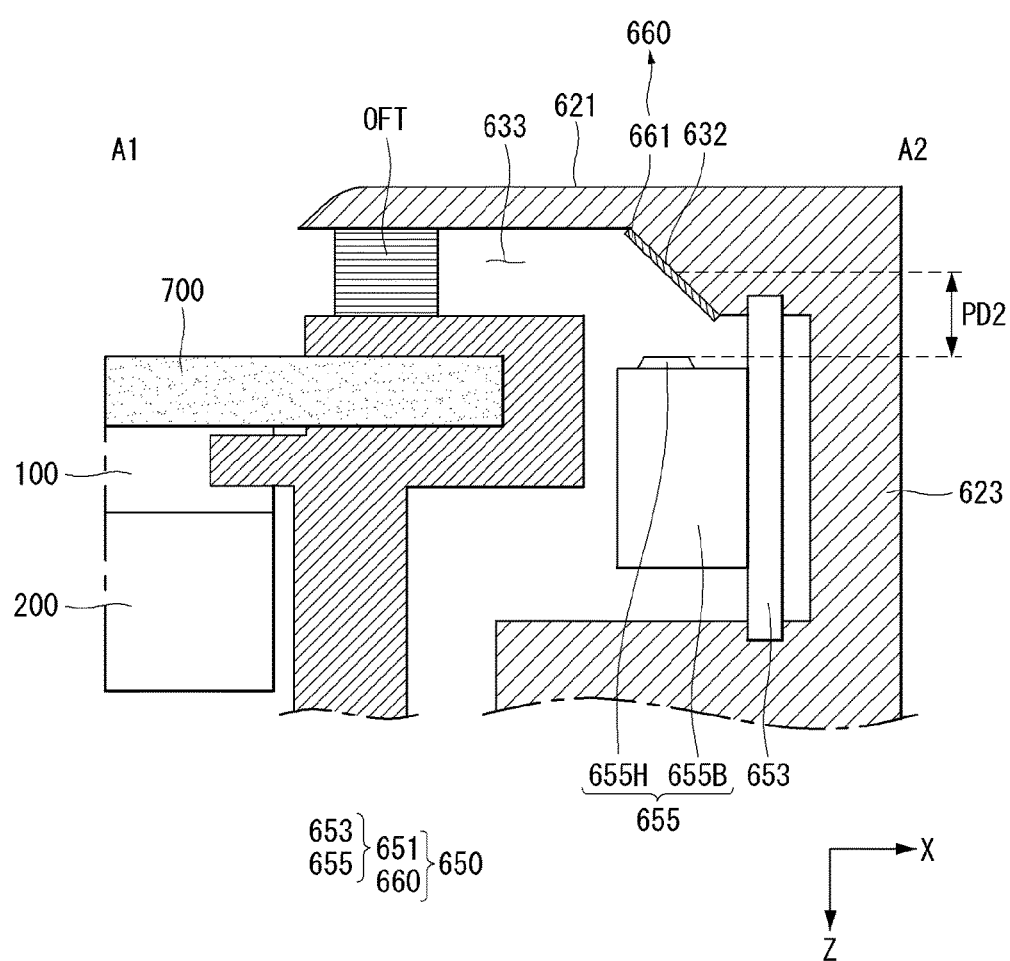

Referring to FIG. 6, the first receiving portion 631 and/or the second receiving portion 632 may be located beside of the fourth receiving portion 634. The optical assembly 651 and/or the reflective panel 661 may be beside of the protective panel 700. The light beam generated from the optical assembly 651 may reach the reflective panel 661 without passing through the protective panel 700.

The distance between the light source 655 and the reflective panel 661 may be a second distance PD2. The light beam may travel the second distance PD2 from the light source 655 to the optical bender 660, without passing through the protective panel 700. The second distance PD2 may be smaller than the first distance PD1 (see FIG. 5). When the distance between the light source 655 and the optical bender 660 is shorter, the ratio of the light beams reaching the optical bender 660 among the light beams generated by the light source 655 may be greater.

The optical filter OFT may be accommodated in the third receiving portion 633. The optical filter OFT may seal the third receiving portion 633. The optical filter OFT may collimate the light beam incident on the optical filter OFT. The optical filter OFT may be capable of filtering the wavelength of the light incident on the optical filter OFT. For example, the optical filter OFT can remove a part of the light corresponding to wavelengths other than the infrared among the light rays incident on the optical filter OFT. For example, light passing through the optical filter OFT may have a higher infrared light ratio than light incident on the optical filter OFT.

Figure 7:
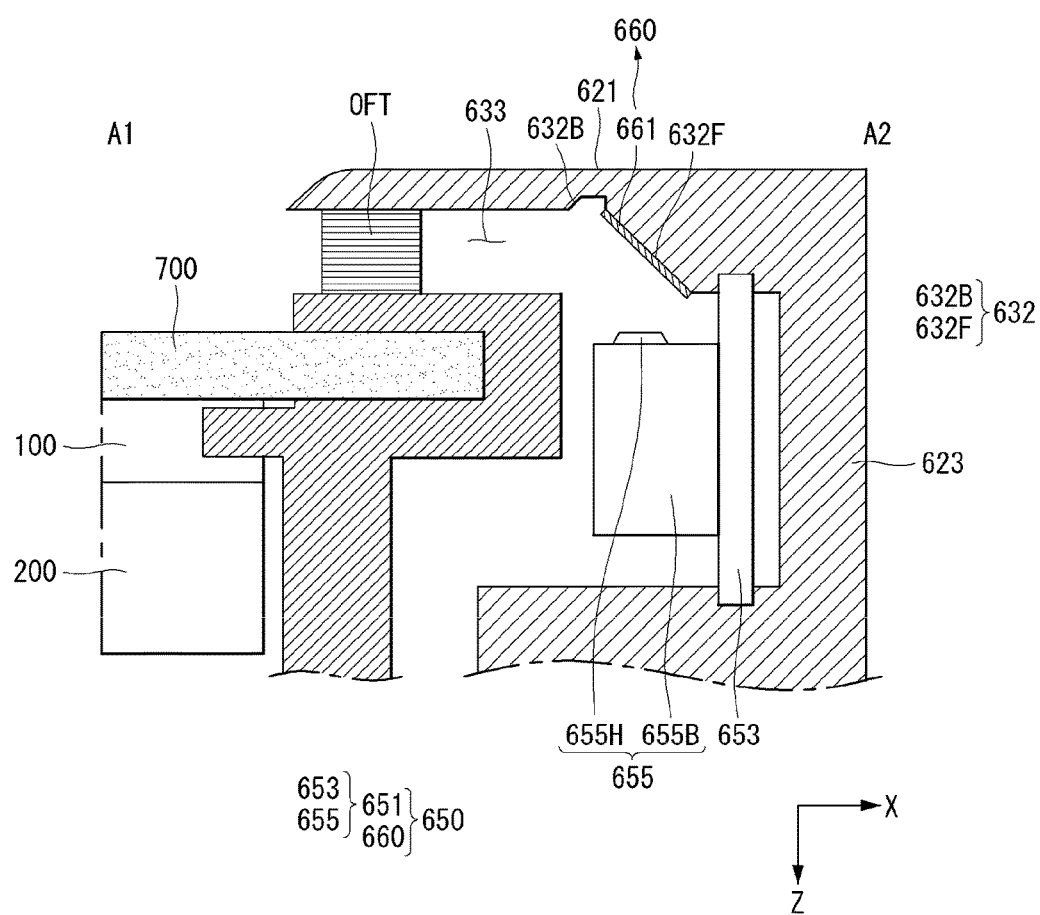

Referring to FIG. 7, the second receiving portion 632 may include a second receiving portion facing part 632F and a second receiving portion shielding part 632B. The second receiving portion facing part 632F may have a shape that is inclined with respect to the light source 655.

The second receiving portion shielding part 632B may be connected to the second receiving portion facing part 632F. The second receiving portion shielding part 632B may have a depressed shape. The second receiving portion shielding part 632B may be concave with respect to the light source 655.

The second receiving portion shielding part 632B may be located between the second receiving portion facing part 632F and the third receiving portion 633. The second receiving portion shielding part 632B can absorb a portion of the light. For example, at least a part of the light incident on the second receiving portion shielding part 632B may not travel toward the third receiving portion 633.

A light absorbing substance may be applied to the second receiving portion shielding part 632B and/or the third receiving portion 633. The light absorbing substance can absorb at least part of the incident light. For example, the light absorbing substance may have different degree of absorption dependent on the wavelength of the incident light. For example, the light absorbing substance applied on the second receiving portion shielding part 632B may have relatively low degree of absorption of infrared light.

The second receiving portion shielding part 632B may improve the properties and profiles of the light traveling to the third receiving portion 633 by using the applied light absorbing substance as well as the structure of the second receiving portion shielding part 632B.

Figure 8:
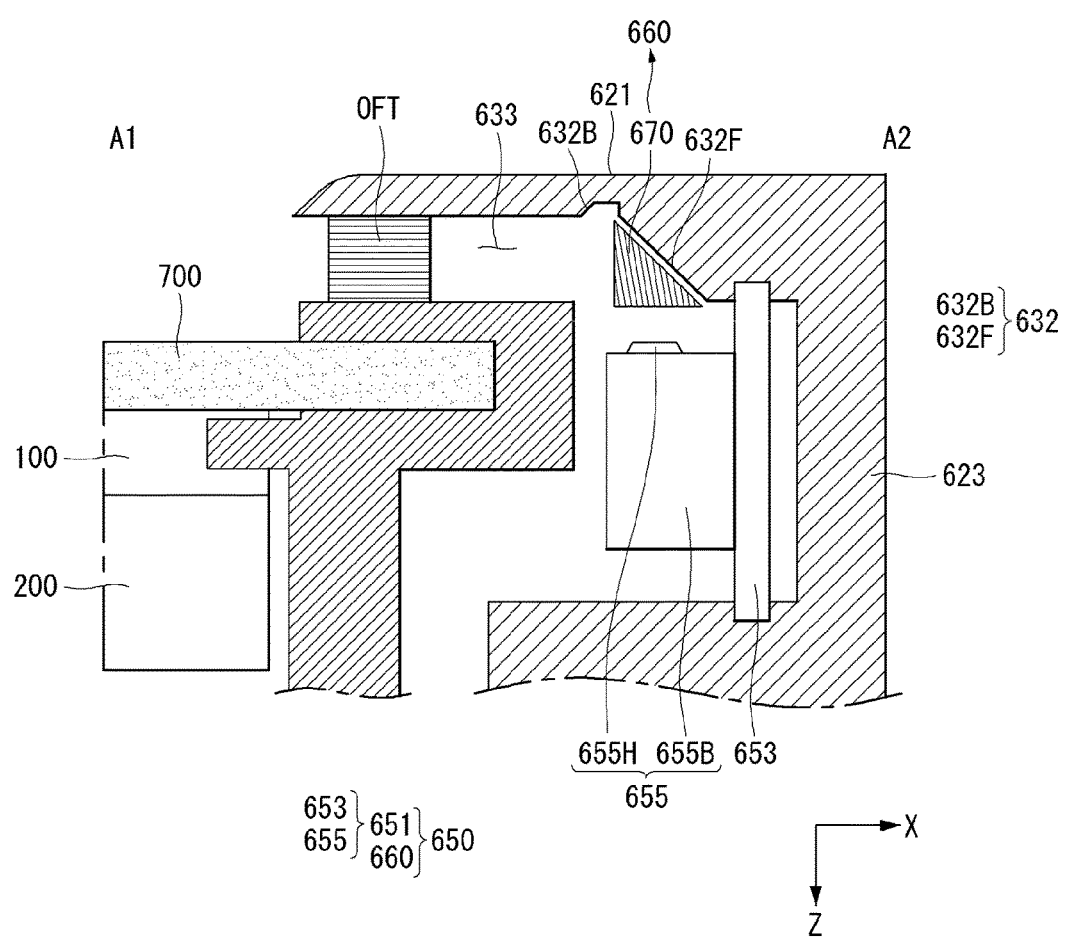

Referring to FIG. 8, the optical bender 660 may include a reflective lens 670. The reflective lens 670 may be adjacent to the second receiving portion facing part 632F. The reflective lens 670 may be transparent.

The reflective lens 670 may receive and refract light from the light source 655. Reflective lens 670 may have a refractive index greater than one. For example, the reflective lens 670 may comprise PC (Poly Carbonate) or PMMA resin.

The reflective lens 670 may have the shape of a prism. The cross section of the reflective lens 670 may have a right triangular shape. The hypotenuse of the right triangular cross section of the reflection lens 670 may face the second receiving portion facing part 632F.

A light directed to the reflective lens 670 can be incident at an angle to the base (or bottom) of the reflective lens 670. The light incident on the reflective lens 670 can be refracted dependent on the incidence angle and then travel.

When light traveling in the reflective lens 670 reaches the hypotenuse of a right triangular section of the reflective lens 670, the light may be transmitted to the outside of the reflective lens 670 or may be reflected, which are dependent on the incident angle. The reflection of the light inside the reflective lens may be referred to as 'total internal reflection'.

Light that is reflected at the hypotenuse of the right triangular cross section of the reflective lens 670 and reaches the other side (or surface) of the reflection lens 670 can be transmitted to the outside of the reflective lens 670. The light transmitted to the outside of the reflective lens 670 can pass through the third receiving portion 633 and travel outside the frame 610.

Figure 9:
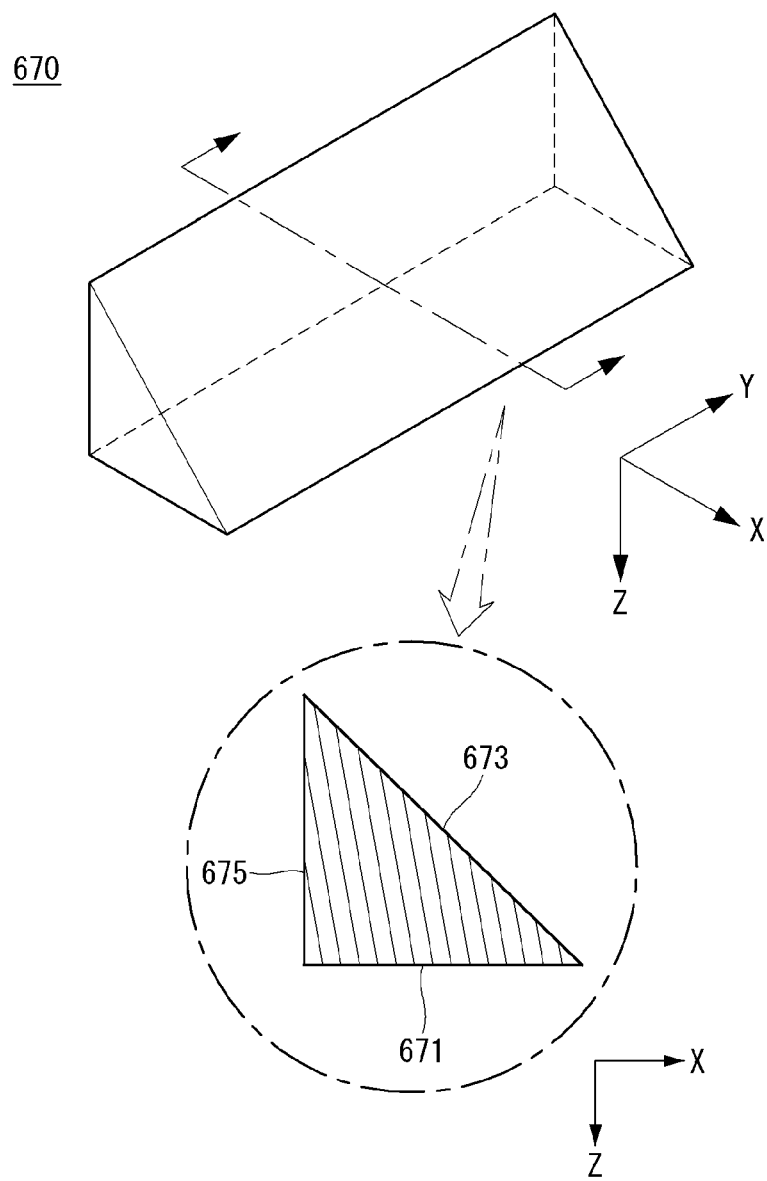
FIGS. 9 and 10 are views showing the reflection lens shown in FIG. 8.

Referring to FIG. 9, the reflective lens 670 may have a shape of a column. For example, the reflective lens 670 may have the shape of a triangular prism whose cross section is a triangle. The triangle, for example, may be a right triangle.

The reflective lens 670 can be described in terms of a cross section. For example, the reflective lens 670 may have a right triangular cross-section. The hypotenuse of the reflective lens 670 may be referred to as a reflection side 673 or a reflection surface 673. One of the remaining two sides of the reflective lens 670 may be referred to as an incident surface 671 and the other may be referred to as an ejecting surface 675.

The incident surface 671 and the ejecting surface 675 may form an angle. For example, the incident surface 671 and the ejecting surface 675 may form a right angle. The incident surface 671 may be similar to the ejecting surface 675 in terms of a length or area.

The reflection surface 673 may have a larger width or a larger length in comparison with the incident surface 671 and the ejecting surface 675. The reflection surface 673 may form an inclination with respect to the incident surface 671. For example, the reflection surface 673 may form an inclination of 45 degrees with respect to the incident surface 671. The reflection surface 673 may form an inclination with respect to the ejecting surface 675. For example, the reflection surface 673 may form an inclination of 45 degrees with respect to the ejecting surface 675.

Figure 10:
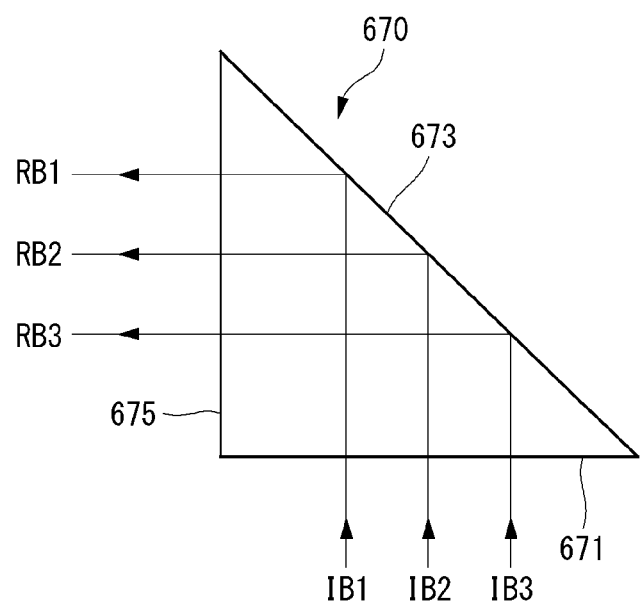

Referring to FIG. 10, light beams IB1, IB2, and IB3 may be incident toward the incident surface 671. Light beams IB1, IB2 and IB3 may comprise a first light beam IB1, a second light beam IB2 and a third light beam IB3. The light beams IB1, IB2 and IB3 may be referred to as incident beams IB1, IB2 and IB3.

The light beams IB1, IB2, and IB3 may be incident vertically toward the incident surface 671 for convenience of explanation. For convenience of explanation, the light beams IB1, IB2, and IB3 may have zero angle of beam spread. This hypothesis can be understood for the light beams IB1, IB2 and IB3 to have similar properties to the laser beam.

The incident beams IB1, IB2 and IB3 vertically incident on the incident surface 671 may pass through the incident surface 671 vertically and travel toward the reflection surface 673. The incident beams IB1, IB2 and IB3 reached the reflection surface 673 can be reflected on the reflection surface 673 by an action of the total internal reflection.

The light beams RB1, RB2, and RB3 may be referred to as reflected beams RB1, RB2, and RB3. The reflected beams RB1, RB2, and RB3 reflected by the reflection surface 673 can travel toward the ejecting surface 675. The reflected beams RB1, RB2, and RB3 directed to the ejecting surface 675 can be incident perpendicularly to the ejecting surface 675. Reflected beams RB1, RB2, and RB3 vertically incident on the ejecting surface 675 can pass through the ejecting surface 675.

The first light beam IB1, the second light beam IB2 and the third light beam IB3 incident on the incident surface 671 may be parallel. The profile of the light beam IB1, IB2 and IB3 may be considered being both ideal and collimated. A plurality of light beams generated from a light source is mostly not parallel to each other and thus can have an angle of beam spread. As the angle of beam spread increases, the directivity of the light beam can be reduced. As the directivity of the light beam is reduced, the intensity of the light beam reaching in a certain direction can be reduced.

Figure 11:
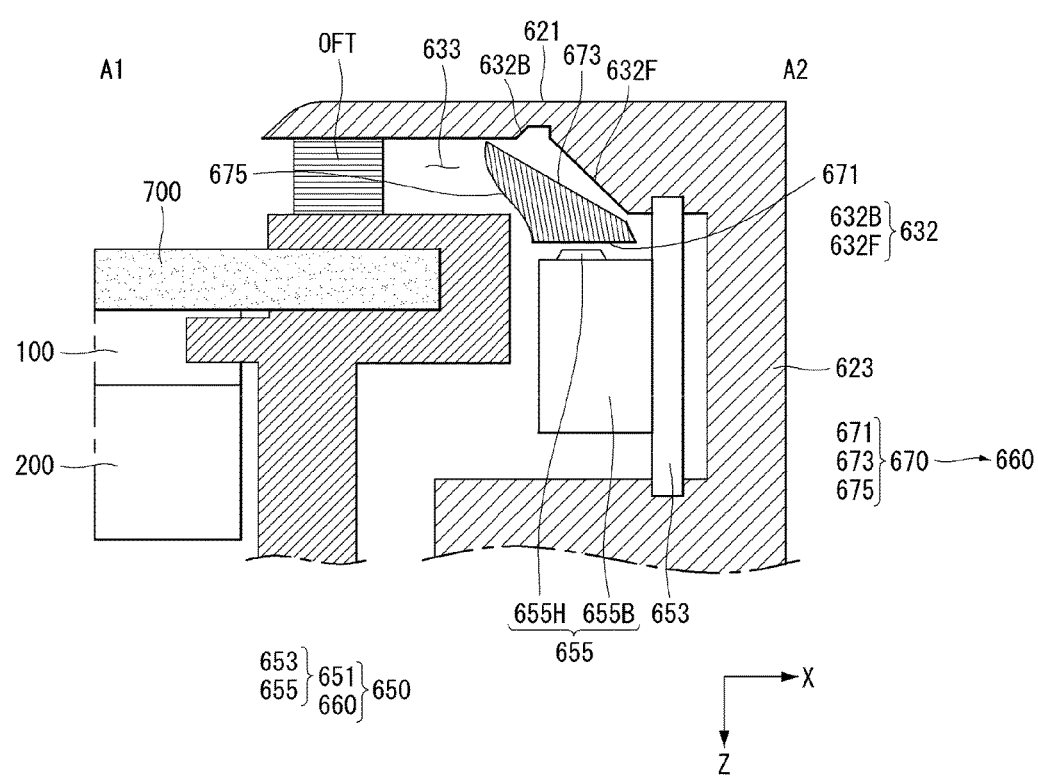
FIG. 11 is a view showing another embodiment of the reflection lens, sectional view of the display device taken along the line A1-A2 in FIG. 1.

Referring to FIG. 11, the incident surface 671 of the reflective lens 670 may face the light source 655. The incident surface 671 of the reflective lens 670 may be flat. The incident surface 671 of the reflective lens 670 may face the light source 655. The incident surface 671 of the reflective lens 670 may be disposed so as to be close to the light source 655. The distance between the incident surface 671 of the reflective lens 670 and the light source 655 may affect the traveling path of the light beam generated by the light source 655.

The reflection surface 673 of the reflective lens 670 may be extended from the incident surface 671 of the reflective lens 670. The reflection surface 673 of the reflective lens 670 may face the second receiving portion facing part 632F and/or the second receiving portion shielding part 632B. The reflection surface 673 of the reflective lens 670 can form an inclination with respect to the second receiving portion facing part 632F. A space may be formed between the reflection surface 673 of the reflective lens 670 and the second receiving portion facing part 632F. A gap may be formed between the reflection surface 673 of the reflective lens 670 and the second receiving portion facing part 632F. The gap formed between the reflection surface 673 of the reflective lens 670 and the second receiving portion facing part 632F may become greater as it goes to the third receiving portion 633 or the second receiving portion shielding part 632B. The shape of the gap formed between the reflection surface 673 of the reflective lens 670 and the second receiving portion facing part 632F may suppress the interference of the light that has passed through the reflection surface 673 of the reflective lens 670.

The ejecting surface 675 of the reflective lens 670 may face the third receiving portion 633. The ejecting surface 675 of the reflective lens 670 may be convex toward the third receiving portion 633. For example, a portion of the ejecting surface 675, which faces the third receiving portion 633, can be convex toward the third receiving portion 633. Another portion of the ejecting surface 675 of the reflective lens 670 may be concave or flat. For example, the other portion of the ejecting surface 675 that does not face the third receiving portion 633 may be concave or flat.

Figure 12:
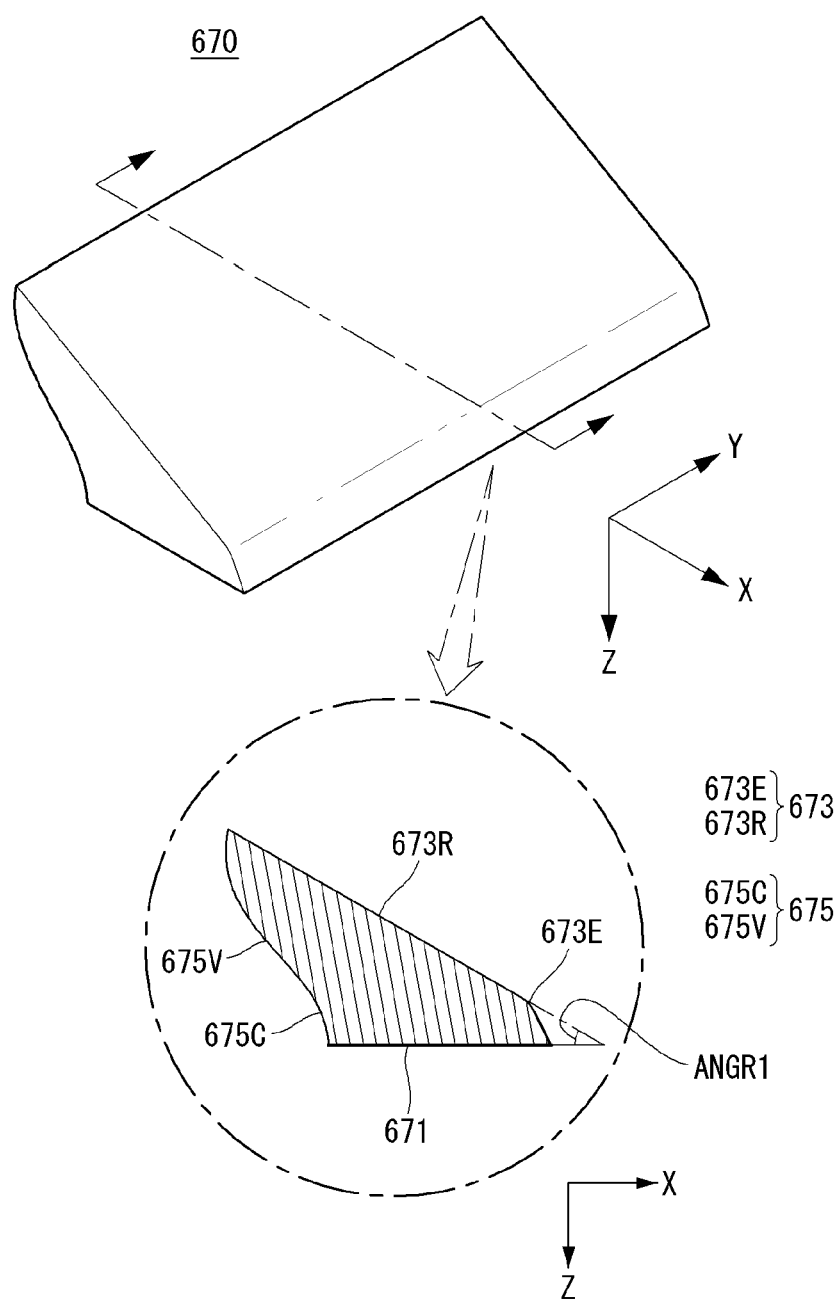
FIGS. 12 and 13 are views showing the reflection lens shown in FIG. 11.

Referring to FIG. 12, the reflective lens 670 may have a shape of a column. Reflective lens 670 may include an incident surface 671, a reflection surface 673, and an ejecting surface 675. The incident surface 671, the reflection surface 673, and the ejecting surface 675 may be connected to each other. The incident surface 671, the reflection surface 673 and the ejecting surface 675 may form lateral surface of the reflective lens 670 from the viewpoint of the shape of a column. The reflection surface 673 and the ejecting surface 675 may be described with reference to the incident surface 671.

The reflection surface 673 may include a reflection surface extension 673E. The reflection surface 673 may be extended from the incident surface 671. For example, the reflection surface extension 673E may be extended from the end of the incident surface 671. The reflection surface reflecting portion 673R may be bent and extended toward the third receiving portion 633 (see FIG. 11) from the reflection surface extension 673E. The reflection surface reflecting portion 673R may face the second receiving portion facing part 632F (see FIG. 11).

The reflection surface 673 may include a reflection surface reflecting portion 673R. The reflection surface reflecting portion 673R may extend from the reflection surface extension 673E. The reflection surface reflecting portion 673R may be bent and extended toward the ejecting surface 675 from the reflection surface extension 673E.

The reflection surface reflecting portion 673R may be flat as a whole. The reflection surface reflecting portion 673R may form a slope with the incident surface 671. The angle formed by the reflection surface reflecting portion 673R and the incident surface 671 may be referred to as a first reflection surface angle ANGR1. For example, the first reflection surface angle ANGR1 may be less than 45 degrees. For example, the first reflection surface angle ANGR1 may be about 30 degrees.

The ejecting surface 675 may include a ejecting surface convex portion 675V. The ejecting surface convex portion 675V may meet the reflection surface 673. The ejecting surface convex portion 675V may be bent and extended from the reflection surface 673. The ejecting surface convex portion 675V may be convex from the inside of the reflective lens 670 toward the outside of the reflective lens 670.

The ejecting surface 675 may include an ejecting surface concave portion 675C. The ejecting surface concave portion 675C may be extended from the ejecting surface convex portion 675V and meet the incident surface 671.

The ejecting surface concave portion 675C may have different curve characteristics compared to the curve characteristics of the ejecting surface convex portion 675V. For example, the ejecting surface concave portion 675C may be concave from the inside of the reflective lens 670 toward the outside of the reflective lens 670. For another example, the ejecting surface concave portion 675C may be flat as a whole.

Figure 13:
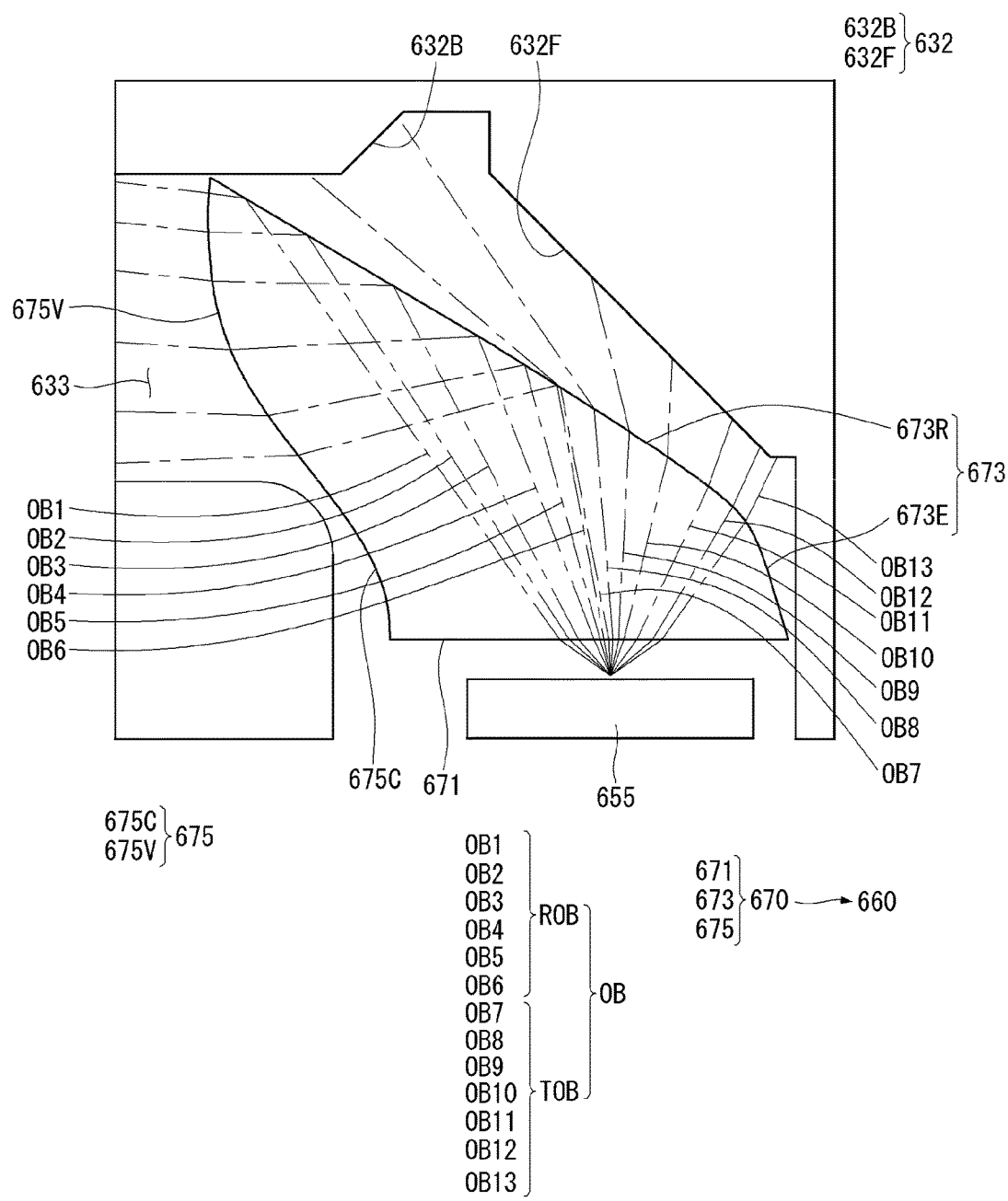

Referring to FIG. 13, a light OB may be generated from the light source 655 and travel toward the incident surface 671 of the reflective lens 670. The light OB may have an angle of beam spread. The light OB may include the first to thirteenth optical beams OB1 to OB13 distributed in the angle of beam spread. The first optical beam OB1 may be adjacent to the third receiving portion 633 at between the light source 655 and the incident surface 671. The thirteenth optical beam OB13 may be located far away from the third receiving portion 633 at between the light source 655 and the incident surface 671. The second to twelfth optical beams OB2 . . . OB12 may be distributed sequentially between the first optical beam OB1 and the thirteenth optical beam OB13.

The optical beam OB can pass through the incident surface 671. The optical beam OB can be refracted while passing through the incident surface 671. The degree to which the optical beam OB is refracted at the incident surface 671 may depend on the angle of incidence with respect to the incident surface 671. The degree to which the first optical beam OB1 is refracted at the incident surface 671 may be different from the degree to which the second optical beam OB2 is refracted at the incident surface 671.

The optical beam OB having passed through the incident surface 671 can travel inside the reflective lens 670. The optical beam OB traveling in the interior of the reflective lens 670 can reach the reflection surface 673 of the reflective lens 670. For example, the optical beam OB traveling inside the reflective lens 670 can reach the reflection surface reflecting portion 673R.

A portion of the light beam OB reaching the reflection surface 673 of the reflection lens 670 may be reflected by the reflection surface 673. The optical reflection on the reflection surface 673 may be resulted from total internal reflection. For example, the first to sixth optical beams OB1 ... OB6 may be reflected at the reflection surface 673 and travel inside the reflective lens 670. The first to sixth optical beams OB1 to OB6 may be referred to as a reflected optical beam ROB. The reflected optical beam ROB can travel toward the ejecting surface 675. The condition under which the optical beam OB is totally internally reflected at the reflection surface 673 may depend on the angle at which the optical beam OB enters the reflection surface 673 and the refractive index of the reflective lens 670. The refractive index of the reflective lens 670 may mean a relative refractive index to the refractive index of the external medium of the reflective lens 670. For example, the refractive index of the reflective lens 670 may mean a relative refractive index to the refractive index of the air.

Another portion of the optical beam OB reaching the reflection surface 673 of the reflective lens 670 may pass through the reflection surface 673. For example, the seventh light beam to the thirteenth light beam OB7 ... OB13 may be referred to as a transmitted optical beam TOB. The transmitted optical beam TOB can pass through the reflection surface 673. The sixth optical beam OB6 is adjacent to the seventh optical beam OB7 but may be reflected at the reflection surface 673. The angle at which the sixth optical beam OB6 travels toward the reflection surface 673 (with respect to the reflection surface 673) may be smaller than the angle at which the seventh optical beam OB7 travels toward the reflection surface 673. The critical incidence angle for total internal reflection may be between the angle at which the sixth optical beam OB6 travels toward the reflection surface 673 and the angle at which the seventh optical beam OB7 travels toward the reflection surface 673.

The reflected optical beam ROB may travel from the reflection surface 673 to the ejecting surface 675. The reflected optical beam ROB reached the ejecting surface 675 can be refracted at the ejecting surface 675 and travel outside the reflective lens 670. The reflected optical beam ROB can travel from the ejecting surface 675 to the third receiving portion 633.

The distribution profile of the reflected optical beam ROB traveling through the third receiving portion 633 may affect the performance of the reflective lens 670. For example, the performance of the reflective lens 670 can be improved as the individual optical beams OB1 ... OB6 of the reflected optical beam ROB traveling in the third receiving portion 633 are aligned with each other in terms of parallel.

The ejecting surface 675 may have a structure that collimates the optical beam OB that passes through the ejecting surface 675 and travels to the outside of the reflection lens 670. For example, the ejecting surface 675 may include a ejecting surface convex portion 675V. The ejecting surface convex portion 675V may be convex from the inside of the reflective lens 670 toward the outside of the reflective lens 670. The ejecting surface convex portion 675V may face the third receiving portion 633. The ejecting surface convex portion 675V may be located at one end of the third receiving portion 633.

The ejecting surface concave portion 675C may extend from the ejecting surface convex portion 675V and may be connected to the incident surface 671. The ejecting surface concave portion 675C may not face the third receiving portion 633. The ejecting surface concave portion 675C may not be provided with the optical beam OB. The ejecting surface concave portion 675C may have a curve characteristic different from that of the ejecting surface convex portion 675V. For example, the ejecting surface concave portion 675C may be flat or concave toward the outside from the inside of the reflective lens 670.

The transmitted optical beam TOB can travel from the reflection surface 673 of the reflective lens 670 to the outside of the reflective lens 670. For example, the transmitted optical beam TOB can reach the second receiving portion facing part 632F or the second receiving portion shielding part 632B.

When the transmitted light beam TOB arriving at the second receiving portion 632 is reflected and then incident on the reflective lens 670, it may negatively affect the collimation of the reflected optical beam ROB. The second receiving portion 632 can absorb at least a part of the transmitted optical beam TOB which reach the second ejecting portion 632.

The light absorbing substance may be applied on the second receiving portion 632. The light absorbing substance may be applied on a portion of the third receiving portion 633 adjacent to the second receiving portion shielding part 632B. The light absorbing substance can absorb light of a wavelength of a specific region dominantly.

Figure 14:
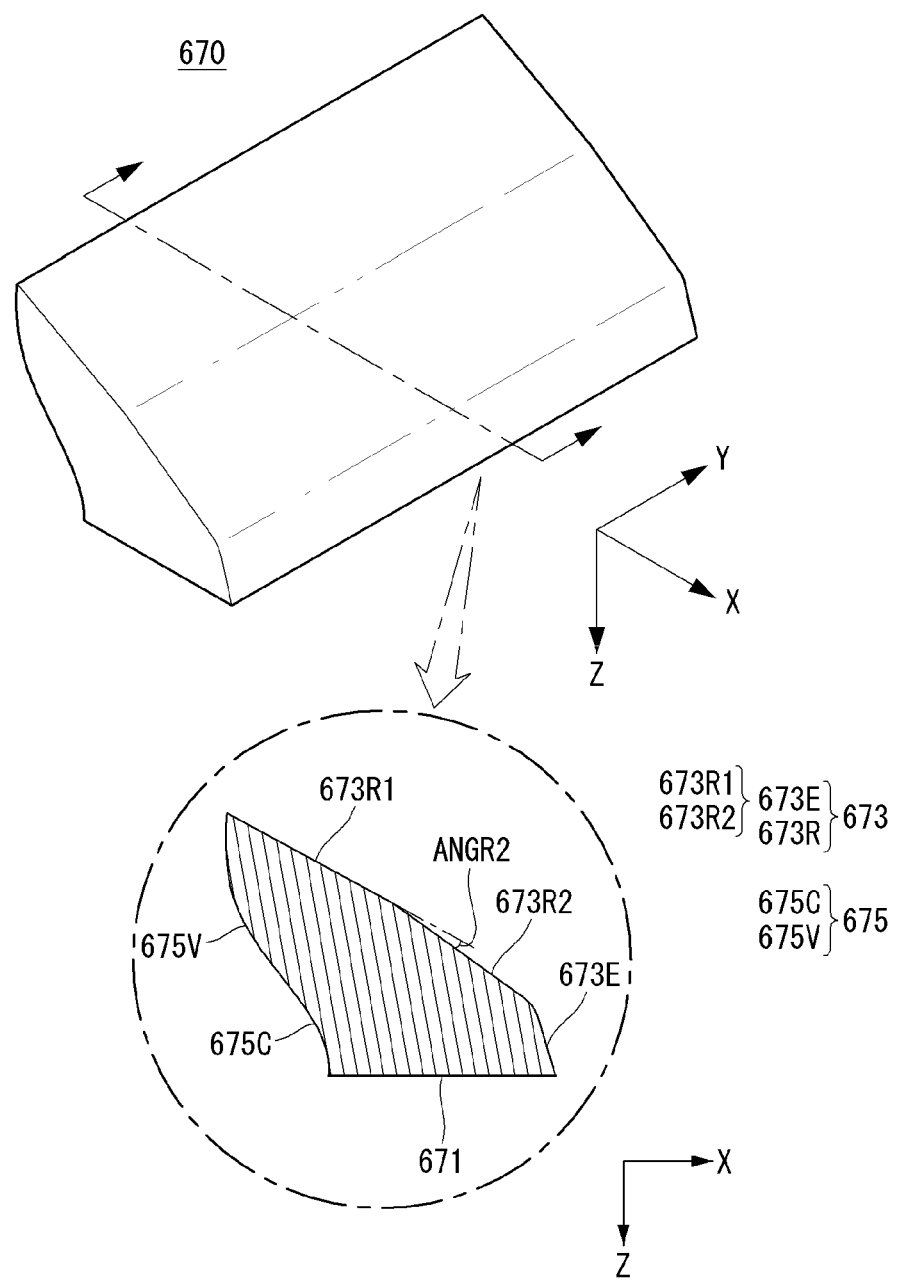
FIG. 14 is a view showing a modified embodiment of the reflection lens shown in FIG. 12.

Referring to FIG. 14, a reflective lens 670 can be observed. The reflection surface reflecting portion 673R may include a first reflection surface reflecting portion 673R1 and a second reflection surface reflecting portion 673R2.

The first reflection surface reflecting portion 673R1 may be extended from the ejecting surface 675. The second reflection surface reflecting portion 673R2 may be extended from the first reflection surface reflecting portion 673R1. The second reflection surface reflecting portion 673R2 may connect the first reflection surface reflecting portion 673R1 and the reflection surface extension 673E.

The second reflection surface reflecting portion 673R2 may form an angle with the first reflection surface reflecting portion 673R1. The angle formed by the first reflection surface reflecting portion 673R1 and the second reflection surface reflecting portion 673R2 can be referred to as a second reflection surface angle ANGR2.

The angle formed by the second reflection surface reflecting portion 673R2 and the incident surface 671 may be larger than the angle formed by the first reflection surface reflecting portion 673R1 and the incident surface 671. The angle formed by the second reflection surface reflecting portion 673R2 and the incident surface 671, may be the sum of the second reflection surface angle ANGR2 and the first reflection surface angle ANGR1 (see FIG. 12). The first reflection surface angle ANGR1 (see FIG. 12) may be the angle formed by the first reflection surface reflecting portion 673R1 and the incident surface 671.

As the angle of the second reflection surface reflecting portion 673R2 with respect to the incident surface 671 increases, the incident angle of the optical beam from the incident surface 671 toward the second reflection surface reflecting portion 673R2 can be smaller. As the incident angle of the optical beam toward the second reflection surface reflecting portion 673R2 becomes smaller, the ratio of the optical beam totally internally reflected at the second reflection surface reflecting portion 673R2 among the optical beam toward the second reflection surface reflecting portion 673R2 may be increased.

Figure 15:
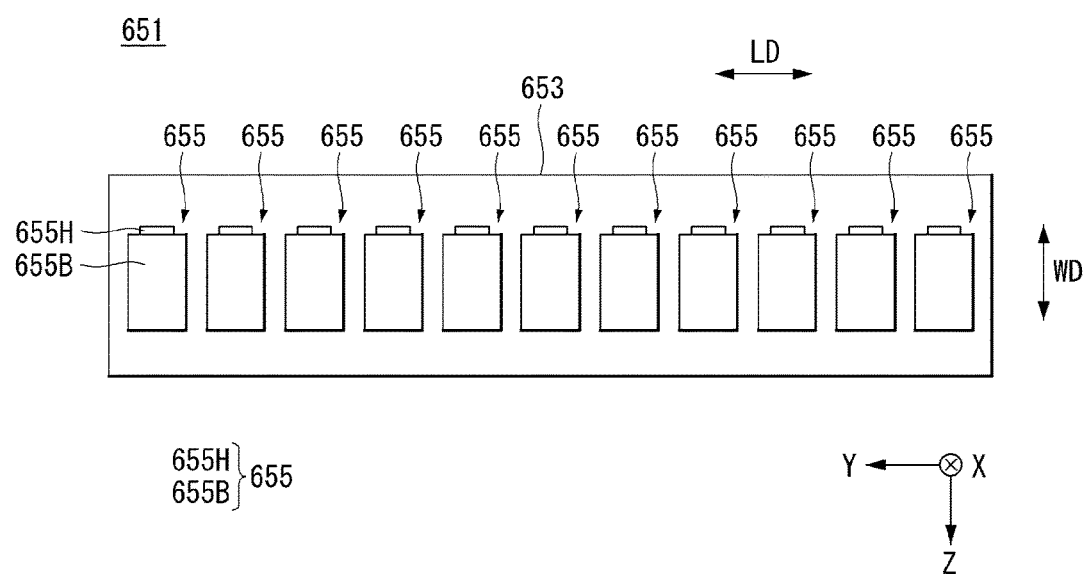
FIGS. 15 to 17 are views showing the optical assembly.

Referring to FIG. 15, an optical assembly 651 can be observed. The optical assembly 651 may include an optical PCB 653 and a light source 655.

The optical PCB 653 may have a shape of a plate. The optical PCB 653 may have a longitudinal direction LD. The optical PCB 653 may have a width direction WD. The longitudinal direction LD and the lateral direction WD of the optical PCB 653 can form a plate-like surface of the optical PCB 653.

The optical assembly 651 may include a plurality of light sources 655. The plurality of light sources 655 may be disposed on a side of the optical PCB 653. The plurality of light sources 655 may be disposed in the longitudinal direction of the optical PCB 653.

The light source 655 may be electrically connected to the optical PCB 653. The light source 655 may be provided with electrical signals and/or power from the optical PCB 653. The light source 655 may include a light source body 655B and a light source head 655H. The light source body 655B may be attached to the optical PCB 653. The light source body 655B may be formed integrally with the optical PCB 653.

The light source 655 may generate a light traveling in the width direction WD of the optical PCB 653. The light source 655 can generate a optical beam traveling in the direction from the light source body 655B toward the light source head 655H.

Figure 16:
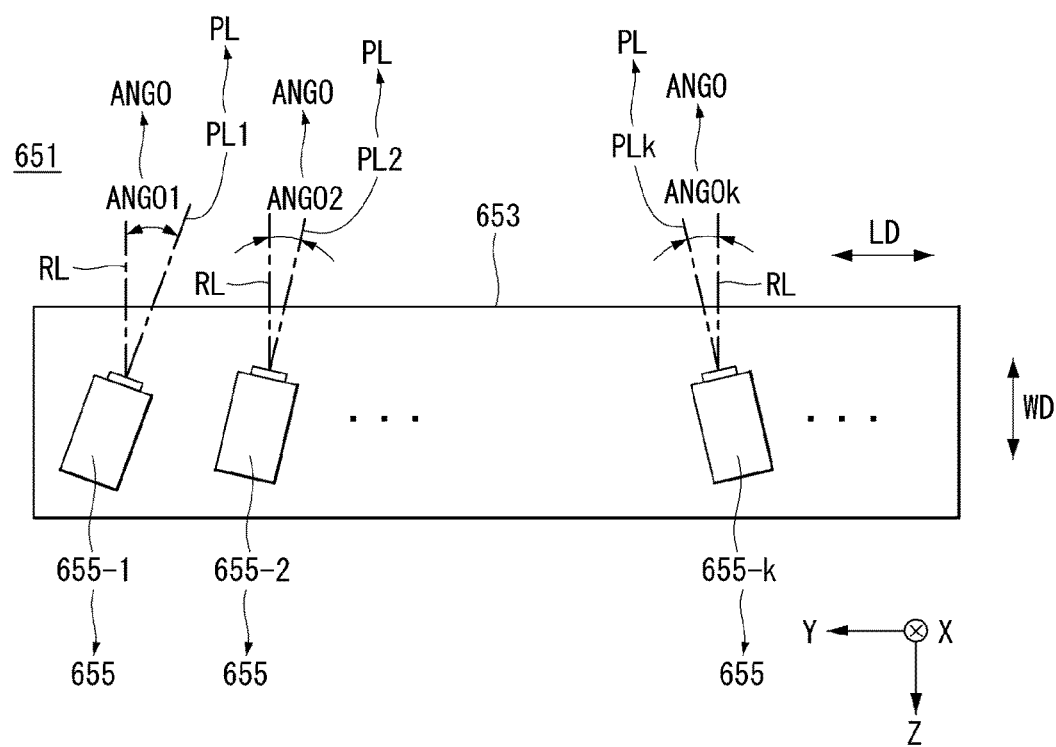

Referring to FIG. 16, the light source 655 may be disposed on the optical PCB 653 such that the optical beam PL generated by the light source 655 is not parallel with the width direction WD of the optical PCB 653. The reference line RL may be considered for each light source 655. The reference line RL may be parallel to the width direction WD of the optical PCB 653. The light source 655 may be disposed on the optical PCB 653 such that the optical beam PL generated by the light source 655 forms an inclination with the reference line RL.

For example, the angle formed by the first optical beam PL1 generated by the first light source 655-1 with respect to the reference line RL may be referred to as a first light angle ANGO1. For example, the angle formed by the second optical beam PL2 generated by the second light source 655-2 with respect to the reference line RL may be referred to as a second light angle ANGO2. For example, an angle formed by the k-th optical beam PLk generated from the k-th light source 655-k with respect to the reference line RL may be referred to as a k-th light angle ANGOk. Here the k is natural number.

The direction in which the light beam PL generated by the plurality of light sources 655 travels may be different depending on the respective light sources 655. A plurality of light beams traveling in different directions for the respective light sources 655 can cause the light beams distributed on the protective panel 700 (see FIG. 3 or 4) to be evenly distributed on the protective panel 700.

Figure 17:
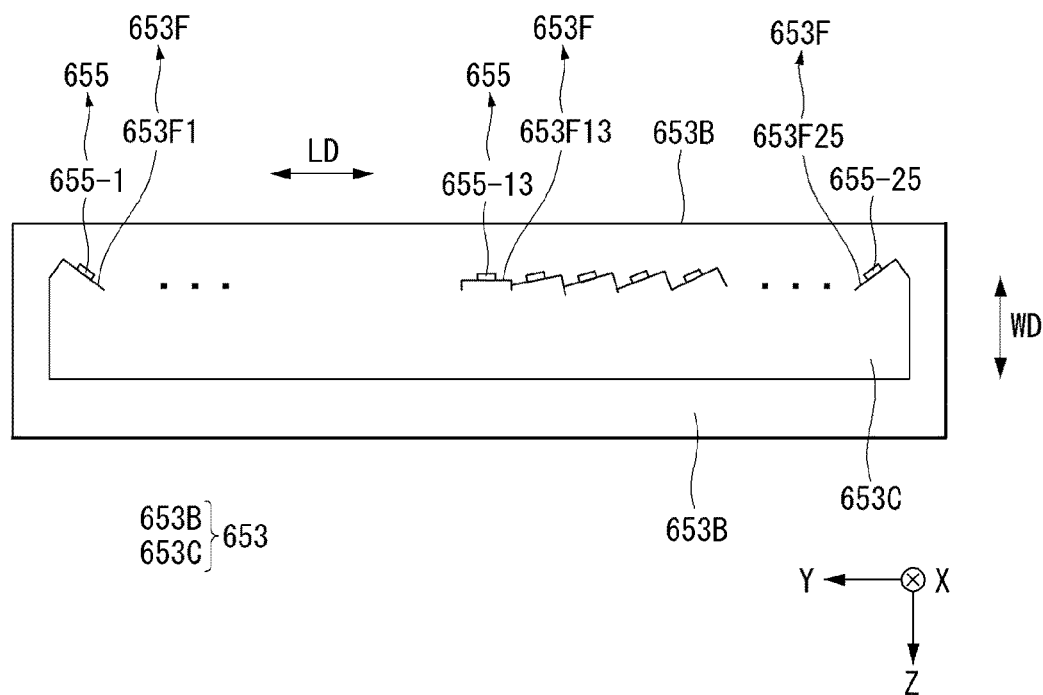

Referring to FIG. 17, the optical PCB 653 may include an optical PCB body 653B. The optical PCB body 653B may have the shape of a plate. The optical PCB body 653B may have a longitudinal direction LD. The optical PCB body 653B may be elongated in the longitudinal direction LD. The plurality of light sources 655 may be arranged in the longitudinal direction LD of the optical PCB body 653B.

The optical PCB 653 may include an optical PCB coupling portion 653C. The optical PCB coupling portion 653C may be disposed on a side of the optical PCB body 653B. For example, the optical PCB coupling portion 653C may be disposed on a front surface of the optical PCB body 653B. The optical PCB coupling portion 653C may protrude from the front surface of the optical PCB body 653B.

The optical PCB 653 may include an optical PCB facing portion 653F. The optical PCB facing portion 653F may be formed on the optical PCB coupling portion 653C. The optical PCB facing portion 653F may be formed in plural. For example, the number of the optical PCB facing portions 653F may correspond to the number of the light sources 655.

The direction in which the optical PCB facing portion 653F faces can be parallel or inclined with respect to the width direction WD of the optical PCB body 653B. For example, the direction in which the first optical PCB facing portion 653F1 or the twenty-fifth optical PCB facing portion 653F25 faces can be inclined with respect to the width direction WD of the optical PCB body 653B. For example, the direction in which the thirteenth optical PCB facing portion 653F13 faces may be parallel to the width direction WD of the optical PCB body 653B. For example, the direction in which the optical PCB facing portion 653F faces may be parallel with the front surface of the optical PCB 653.

The optical PCB facing portion 653F can accommodate the light source 655. The light source 655 may be mounted on the optical PCB facing portion 653F. The traveling direction of the light beam generated by the light source 655 may depend on the relative attitude of the optical PCB facing portion 653F with respect to the optical PCB body 653B.

Figure 18:
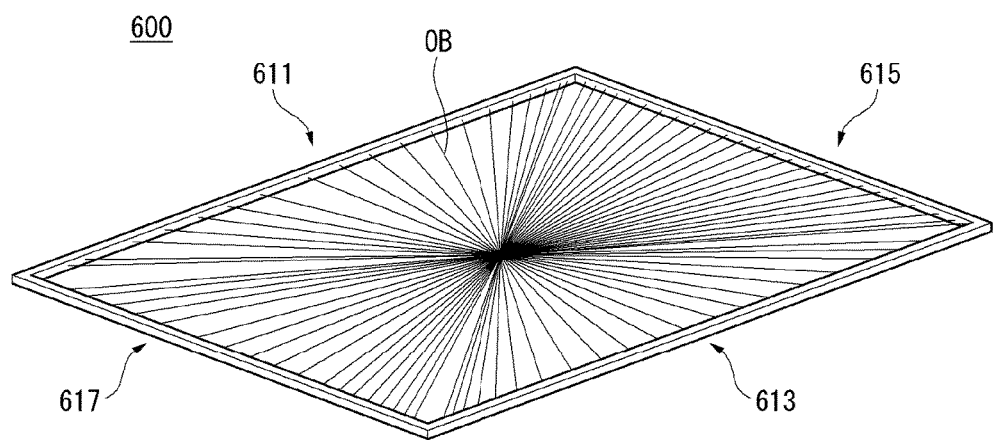
FIG. 18 is a view showing the light generated by a sensor unit according to an embodiment of the present invention.

Referring to FIG. 18, a light beam OB generated from the sensor unit 600 can be observed. The optical beams OB shown in FIG. 18 can be in plural. The light beam OB shown in FIG. 18 can indicate the approximate traveling direction of the light beam OB. That is, in FIG. 18, the region between adjacent optical beams OB may be a region where the optical beams OB travel.

The optical beam OB generated by the sensor unit 600 may travel from the first frame 611 toward the second frame 613. The optical beam OB generated by the sensor unit 600 may travel from the third frame 615 toward the fourth frame 617.

The traveling direction of the optical beam OB traveling from the first frame 611 toward the second frame 613 can be inclined with respect to the first frame 611 or the second frame 613. The traveling direction of the optical beam OB traveling from the third frame 615 toward the fourth frame 617 can be inclined with respect to the third frame 615 or the fourth frame 617.

The optical beam OB generated by the sensor unit 600 may overlap the area between the first frame 611 and the second frame 613. The optical beam OB generated by the sensor unit 600 may overlap the area between the third frame 615 and the fourth frame 617.

Figure 19:
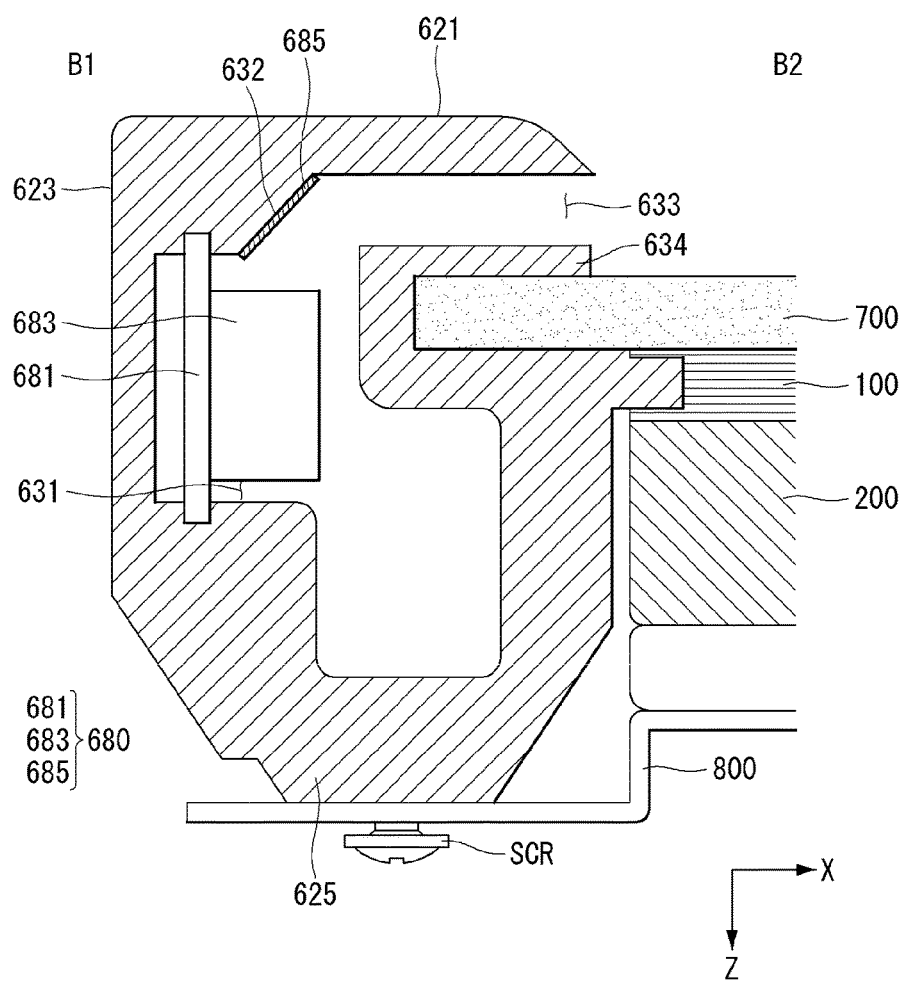
FIGS. 19 and 20 are views showing various embodiments of the optical receiver, sectional views of the display device taken along the line B1-B2 in FIG. 1.

Referring to FIG. 19, the sensor unit 600 may include a optical receiver 680. The optical receiver 680 can be accommodated in the inner frame 630. The optical receiver 680 may include a optical receiving PCB 681, a optical sensor 683, and a reflective panel 685.

The optical receiving PCB 681 can be accommodated in the first accommodating portion 631. The optical receiving PCB 681 may supply power to the optical sensor 683. The optical sensor 683 can sense light. The optical sensor 683 may supply an electrical signal to the optical receiving PCB 681.

The reflective panel 685 may be located in the second receiving portion 632. The reflective panel 685 can face the third receiving portion 633 and the optical sensor 683. The reflective panel 685 can reflect the optical beam which passes through the third receiving portion 633 and reaches the reflective panel 685. The optical beam reflected at the reflective panel 685 may travel toward the optical sensor 683.

Figure 20:
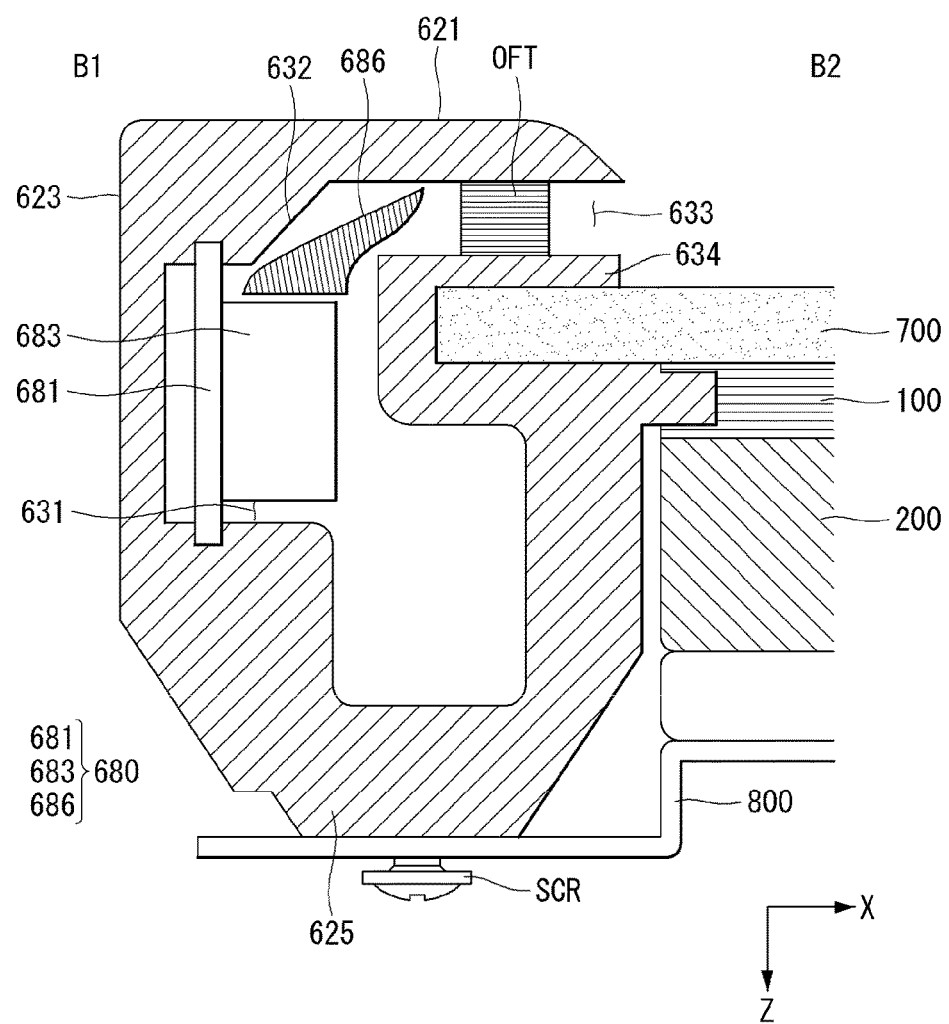

Referring to FIG. 20, the optical receiver 680 may include a optical receiving PCB 681, an optical sensor 683, and a reflective lens 686. The reflective lens 686 shown in FIG. 20 may have the same or similar structure as the reflective lens 670 shown in FIGS. 11 and 12.

The light beam that has passed through the third receiving portion 633 and reached the reflective lens 686 can be refracted at the outer surface of the reflective lens 686 and travel inside the reflective lens 686. The outer surface of the reflective lens 686 at which the light beam is refracted may face the third receiving portion 633. At least a portion of light beams traveling inside the reflection lens 686 can be reflected (total internal reflection) on a surface of the reflection lens 686 facing the second receiving portion 632. The light reflected within the reflective lens 686 may travel from the interior of the reflective lens 686 toward the optical sensor 683. The optical sensor 683 can sense the incident light beam.

Figure 21:
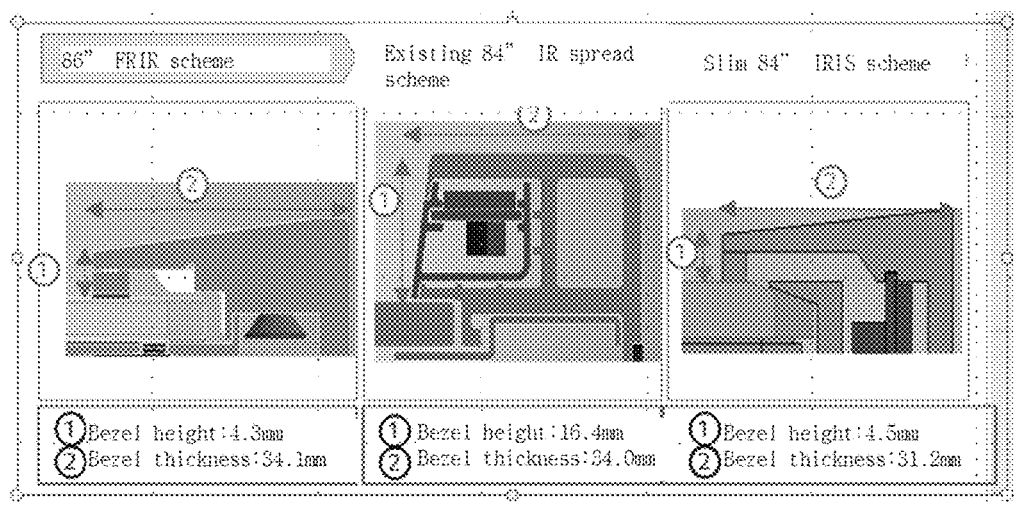
FIGS. 21, 22, 23, 24, 25, 26, and 27 are views related to various embodiments of a total internal reflection lens for collimating light, according to embodiments of the present disclosure.

Other embodiments of the present invention relates to a scheme for minimizing a thickness of a touch screen according to positions of an IR LED and a receiver. An existing IR touch scheme positions an IR LED emission unit at a bottom end, applies a reflecting optical system to bend a path to reduce a thickness of bezel. Reference is made to FIG. 21. In order to reduce the thickness, if No.1 is reduced, a numerical aperture (NA) value of an emission angle of LED is reduced. If the above value is reduced, a light reception efficiency of a receiver is deteriorated so that touch recognition is impossible.

Accordingly, an NA value is increased by 60% level as compared with the related art to increase efficiency. Further, a path of light may be changed through a mirror surface of the reflecting optical system. A rear surface may be used as a principle such as total reflection as a lens optical system. If a total internal reflection lens (TIR) is applied, a light path and light may be collimated so that light receiving efficiency is increased by 30% and greater.

Figure 22:
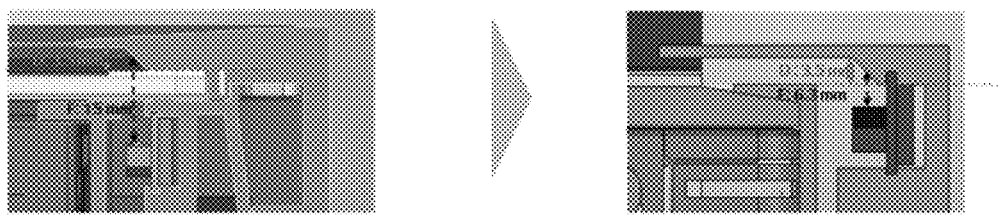

As shown in FIG. 22, light emission efficiency increases according to an interval between the IR LED input unit and the mirror reflecting sheet. On the left portion of FIG. 22, LED-mirror reflecting sheet distance is 15 mm NA reduction according to LED-Mirror reflecting sheet distance. On the right portion of FIG. 22, LED-Mirror reflecting sheet distance is 6.3 mm NA increase through minimization of LED-Mirror reflecting sheet distance.

Figure 23:
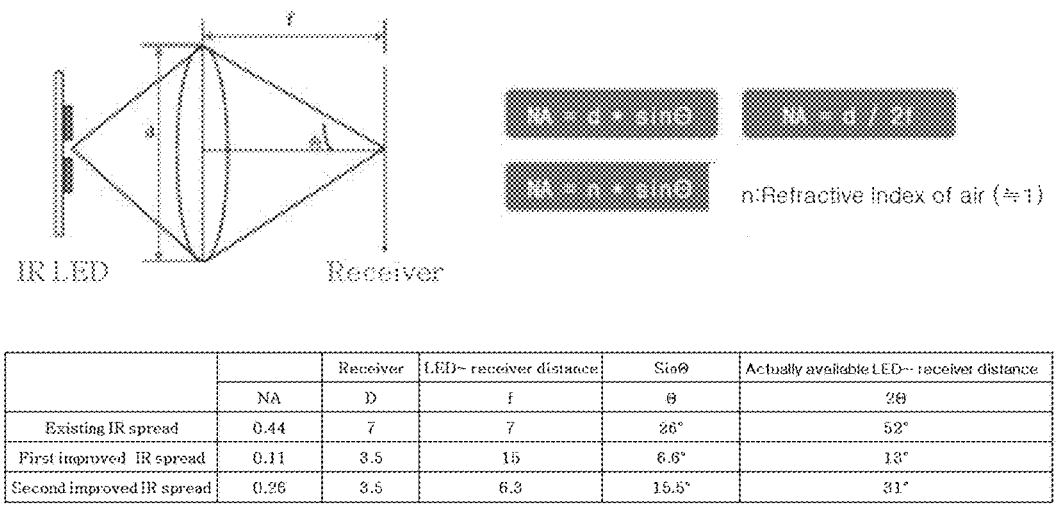

As shown in FIG. 23, light is collimated by limited NA of IR optical system using TIR lens to increase efficiency.

Figure 24:
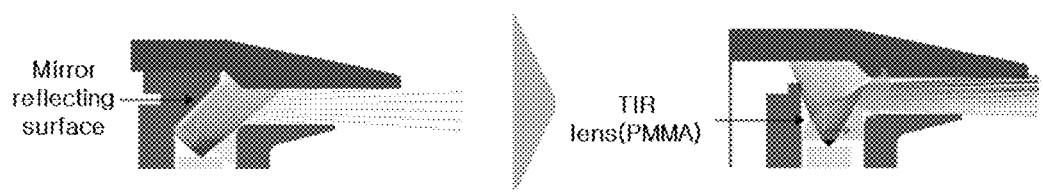

Referring to FIG. 24, on the left portion, the mirror reflection optical system has the following properties: IR optical system NA: 0.26, IR LED oriented angle: 120 degrees, and mirror reflecting sheet application. On the right portion of FIG. 24, the TIR Lens optical system has the following properties: IP optical system NA: 0.23, IR LED and TIR lens oriented angle: 30 degrees, tolerance sensitivity is advantageous and NA may be reduced due to collimating light, and NA bezel height 4 mm or less target possible.

Figure 25:
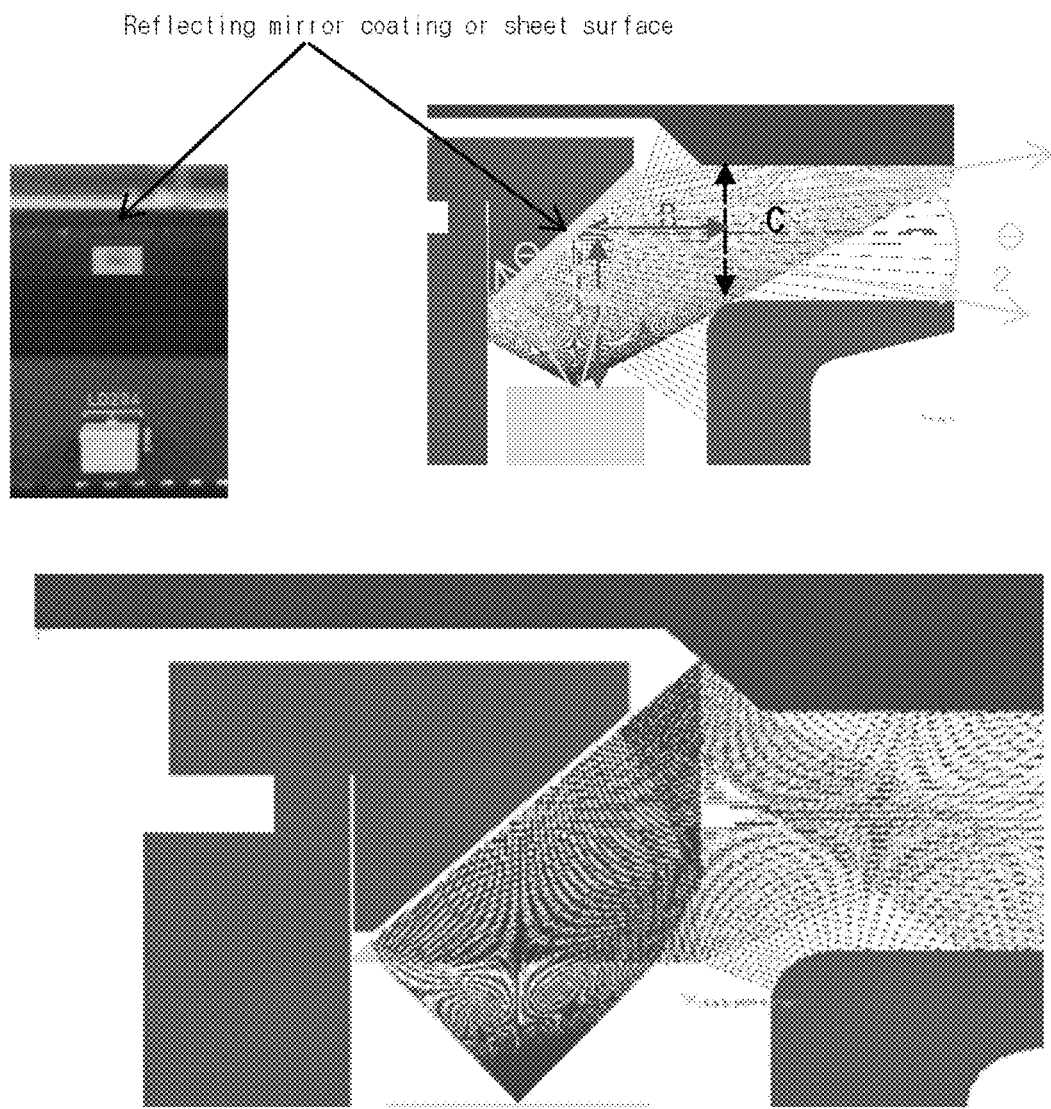

In some embodiments of the present disclosure, light of an IR LED is transferred from a panel and a top end of a glass to reach a light receiving unit. Further, a position of the LED comes down to a bottom end to form a reflecting surface) (45°) so that a path of light emitted from a bottom end is bent by 90°. Since the position of the LED is not changed, an existing algorithm may be used as it is. An emission center of LET should correspond to a center of a reflecting surface and an angle is 45° mirror reflection in a reflecting surface. Reference is made to FIG. 25.

Figure 26:
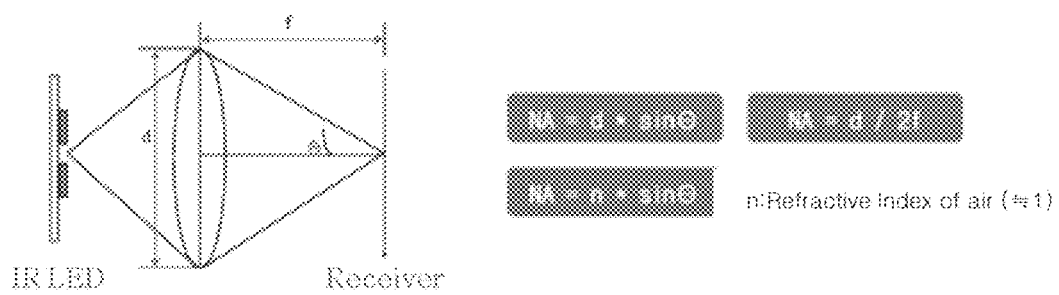

A material of the reflecting surface includes Ag and Al. A 45° prism may be used instead of the reflecting surface. An NA of an optical system is C/A+B. The higher the value is, the better the quality is. A maximum NA of a reflecting optical system is 1 and should be greater than at least 0.2. A maximum NA of a reflecting optical system should be greater than $\Theta 1 > \Theta 2$, the $\Theta 1$ is less than 50° and the $\Theta 2$ should be less than 15°. Reference is made to FIG. 26.

Figure 27:
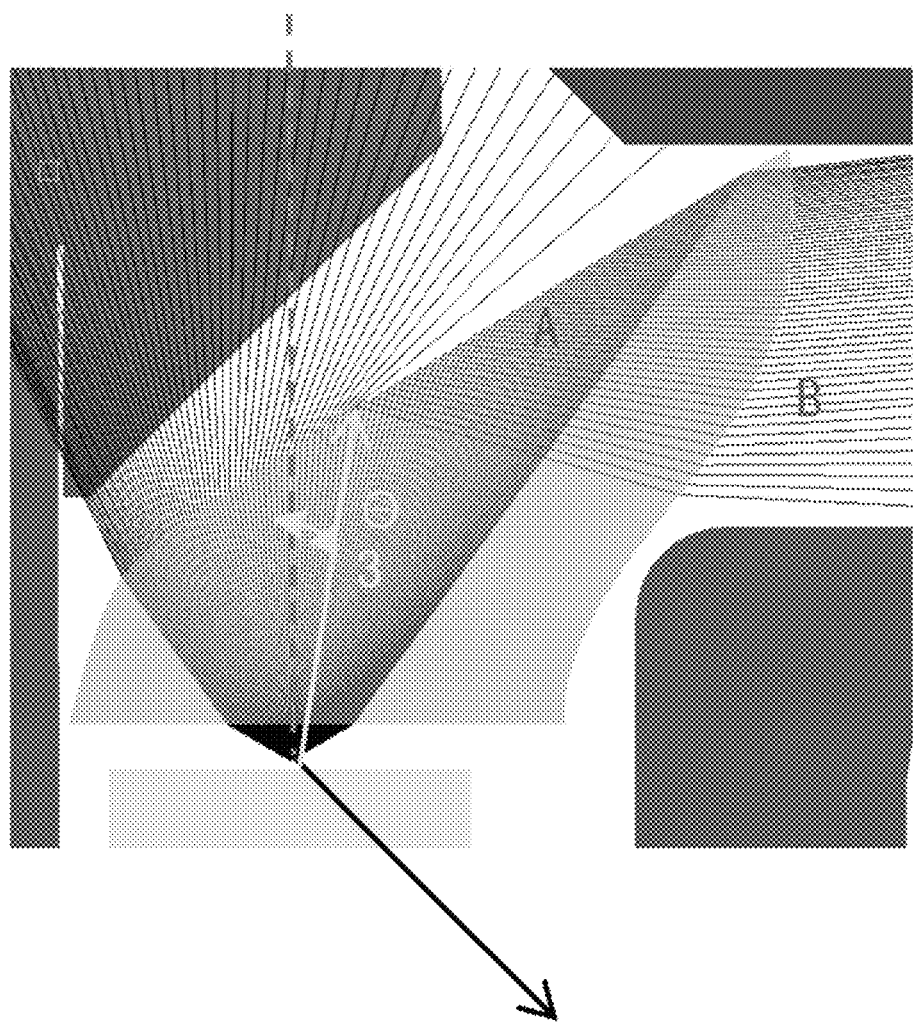

In some embodiments of the present disclosure, a reflecting structure may be used as a total reflection lens. Reference is made to FIG. 27. The lens is located at a top end of IR LED and a material of the lens is PC or PMMA. The lens has an aspheric shape of A and B. The A is a total reflection curve, and the B performs collimation function. The lens refracts at an angle lower than $\Theta 3$ (10°) and totally reflects at an angle greater than $\Theta 3$ to be input to a B surface. An angle of light passing through the input B surface is lower than 30°. Accordingly, an oriented angle of the light passing through the leans optical system is lower than 30° and a distribution angle of light received by a receiver is also greater than 30%.

A distribution of an oriented angle may be collimated within 30° using an optical system according to embodiments of the present invention. The product forms a cylinder type a lens bar through extrusion mold. Ultra slim may be obtained using the reflection and total reflection optical system.

Figure 28:
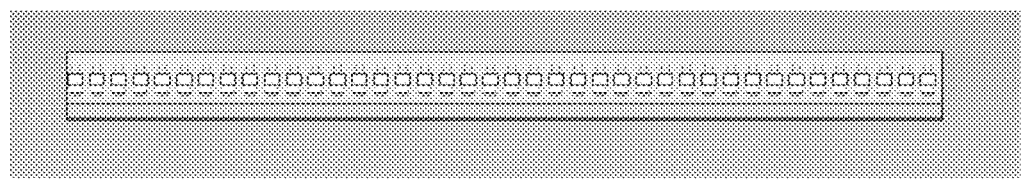
FIGS. 28, 29, 30, 31, 32, 33, and 34 are views related to various embodiments of IR LED and receiver structure according to embodiments of the present disclosure.
Figure 29:
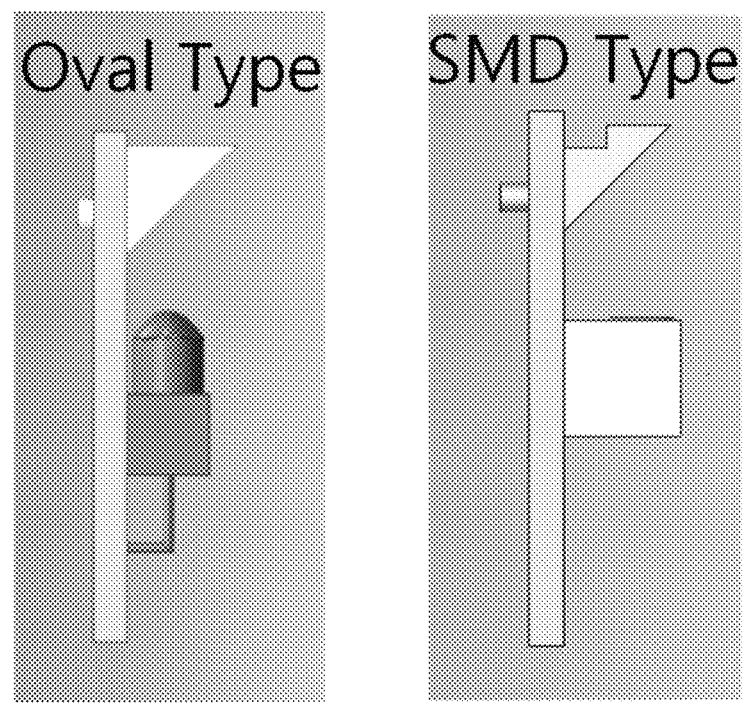

Embodiments of the present disclosure also include an ultra slim IR optical touch system using a reflecting optical system. FIG. 28 shows an example of a structure for fixing a mirror reflecting plate on the same PCB without lifting after surface mount technology (SMT). FIG. 29 shows a comparison of side views of examples of IR LEDs, using an oval type and a surface mount device (SMD) type on the PCB.

Figure 30:

FIG. 30 shows a vertical position deviation of LED may be minimized by fixing a mirror reflecting plate on a PCB without lifting where the IR LED/receiver unit becomes SMT and an ultra slim optical touch tool structure may be configured.

Figure 31:
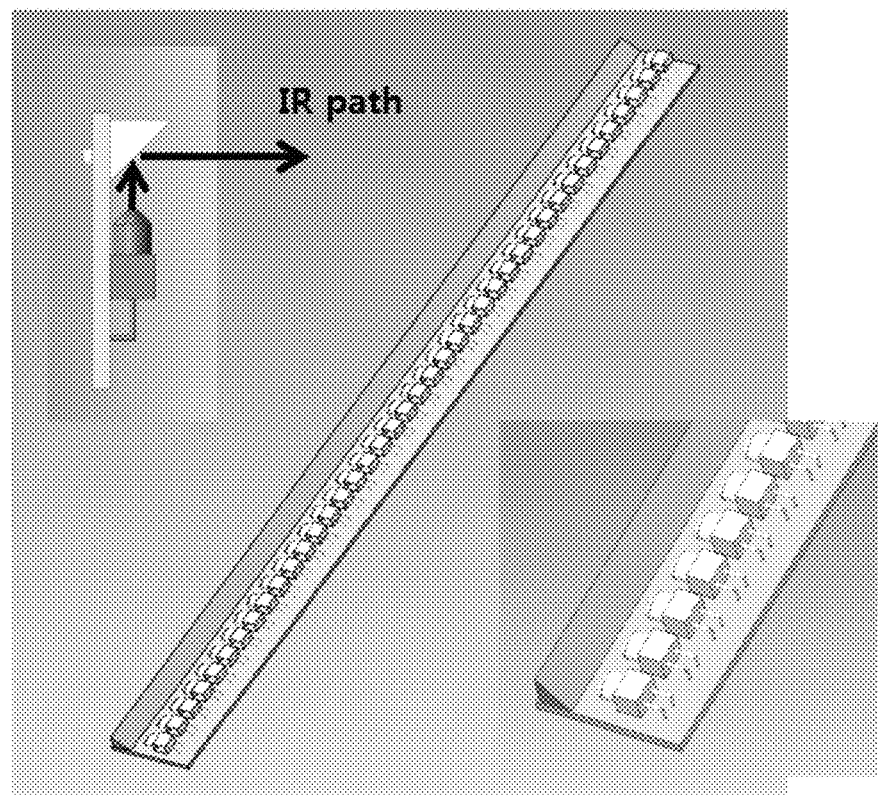

FIG. 31 shows a close-up view of a perspective view showing the oval type IR LED/receiver mounted with a mirror reflected plate fixed on the PCB.

Figure 32:
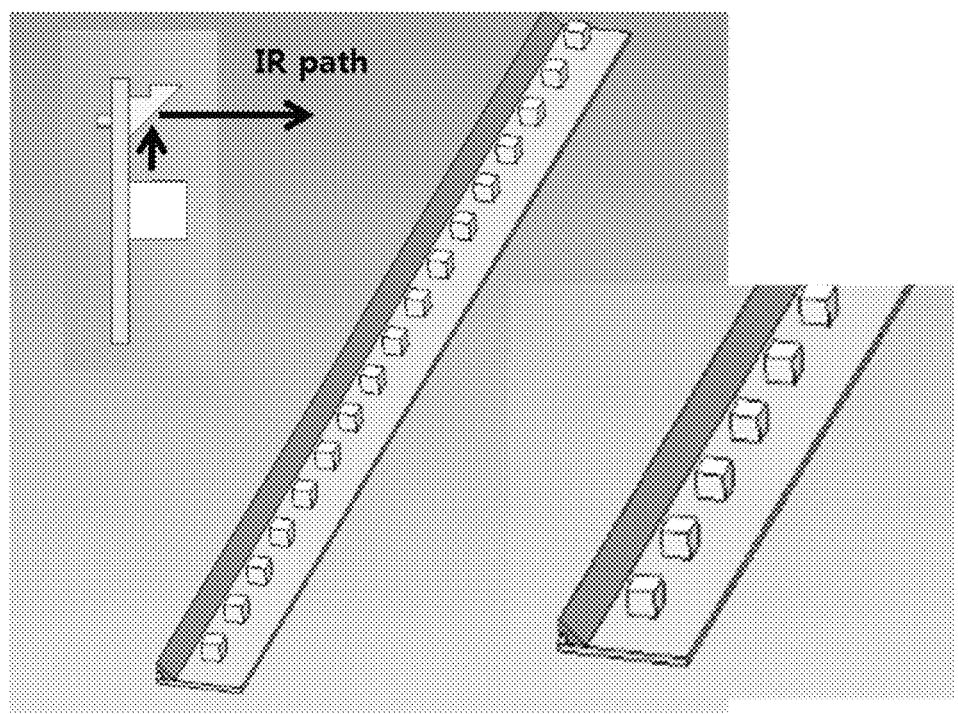

FIG. 32 shows a close-up view of a perspective view showing the SMD type IR LED receiver mounted with a mirror reflected plate fixed on the PCB.

Figure 33:
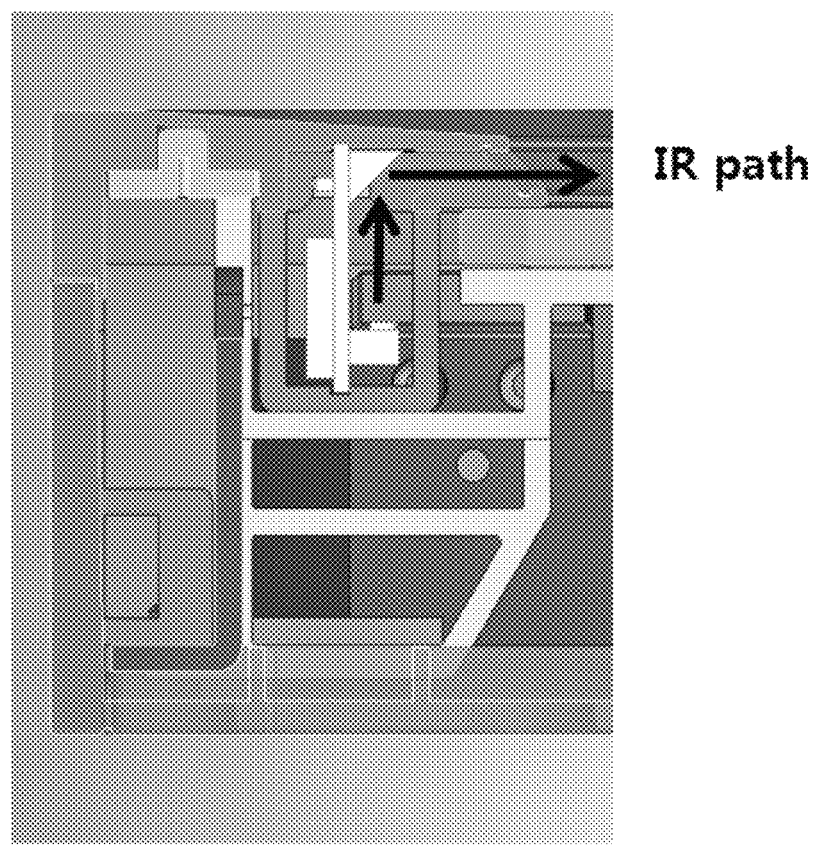

FIG. 33 shows a sectional view of the IR touch PCD to which a reflecting structure is applied according to an embodiment of the present disclosure.

Figure 34:
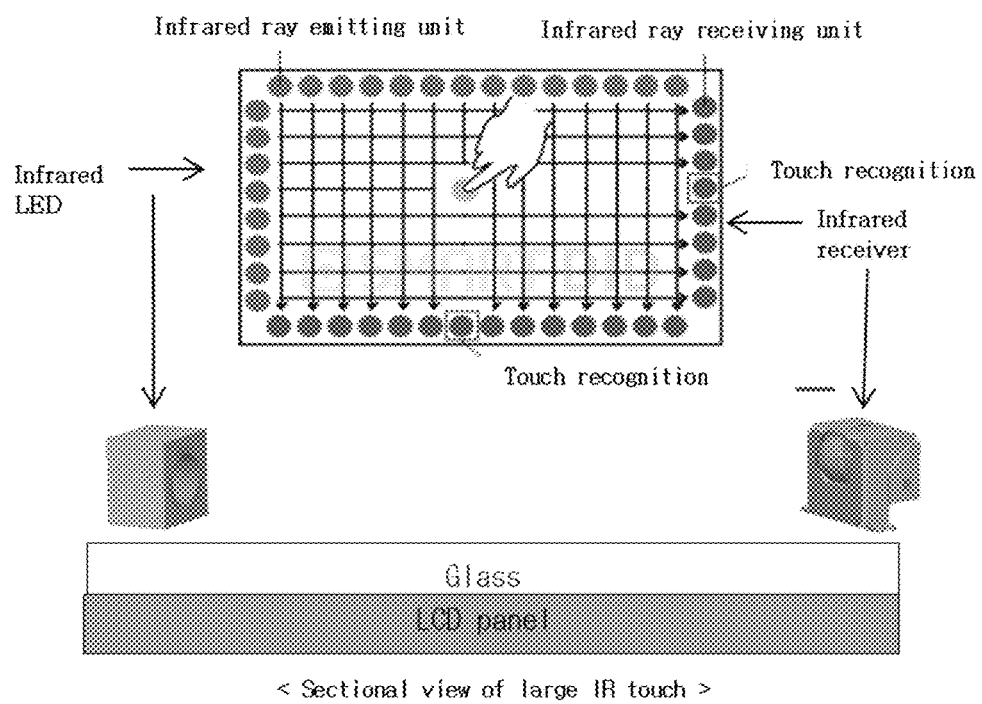

Thus, FIG. 34 shows an illustration of an ultra slim IR optical touch system using reflecting optical syatem according to an embodiment of the present disclosure. The embodiments may present a compact design for a thickness of an electronic board in an IR touch scheme while making a large electronic the IR LED infrared touch may be a scheme of determining a position if an infrared ray is interrupted if the infrared ray is scanned in lattice using infrared rays invisible to a person's eyes.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Certain embodiments or other embodiments of the invention described above are not mutually exclusive or distinct from each other. Any or all elements of the embodiments of the invention described above may be combined or combined with each other in configuration or function.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
    a display panel;
    a protective panel positioned at a front side of the display panel;
    an optical transmitter configured to emit light and positioned outer to a first lateral edge of the protective panel;
    an optical receiver configured to sense the light emitted from the optical transmitter and positioned at a second lateral edge of the protective panel opposite the first lateral edge;
    wherein the optical transmitter comprises:
    a light assembly configured to emit the light; and
    a reflective lens comprising a first side configured to reflect the light emitted from the light assembly and a second side configured to emit the reflected light toward the optical receiver,
    wherein the second side comprises a first convex light ejecting surface and a second concave light ejecting surface.

2. The display device of claim 1, wherein a path of the light between the light assembly and the reflective lens is outer to the first lateral edge of the protective panel.

3. The display device of claim 1, wherein the light emitted from the light assembly does not pass through the protective panel between the optical transmitter and the reflective lens.

4. The display device of claim 1, further comprising a printed circuit board (PCB), wherein the light assembly and the reflective lens are coupled to the PCB.

5. The display device of claim 1, further comprising an optical filter configured to allow only a particular wavelength of the directed light directed from the reflective lens to pass toward the optical receiver.

6. The display device of claim 5, wherein the particular wavelength corresponds to an infrared light wavelength.

7. The display device of claim 1, wherein the first side comprises a flat surface.

8. The display device of claim 7, wherein a surface of the second side continuously transitions from the first convex light ejecting surface to the second concave light ejecting surface.

9. The display device of claim 7, wherein the second concave light ejecting surface is adjacent to a third side of the reflective lens positioned to receive the light emitted from the light assembly.

10. The display device of claim 9, wherein the first side further comprises a convex extension surface adjacent to the third side of the reflective lens, wherein a surface of the first side continuously transitions from the flat surface to the convex extension surface.

11. The display device of claim 1 further comprising a frame, wherein the frame comprises:
    a first receiving portion configured to accommodate the light assembly; and
    a second receiving portion configured to accommodate the reflective lens.

12. The display device of claim 11, wherein the second receiving portion comprises a second receiving portion facing part positioned to face a flat surface of the first side of the reflective lens.

13. The display device of claim 12, wherein a gap between the second receiving portion facing part and the flat surface of the first side increases in a direction toward the optical receiver.

14. The display device of claim 12, wherein the frame further comprises a second receiving portion shielding part adjacent to the second receiving portion facing part, wherein the second receiving portion shielding part is recessed and configured to absorb incident light.

15. The display device of claim 1, wherein the reflective lens is elongated and extends along the first lateral edge of the display panel.

16. The display device of claim 1, wherein the optical receiver comprises:
    a light sensor configured to sense light; and
    a light directing part configured to direct the light reflected from the reflective lens to the light sensor.

17. The display device of claim 16, wherein:
    the optical receiver is positioned outer to the second lateral edge of the protective panel; and
    the light directed from the light directing part does not pass through the protective panel between the light directing part and the light sensor.

18. The display device of claim 16, wherein:
    the light directing part corresponds to a receiving reflective lens configured to direct the reflected light toward the light sensor; and
    the receiving reflective lens comprises:
    a receiving first side configured to receive the light reflected from the reflective lens; and
    a receiving second side configured to reflect the light received through the receiving first side, such that the reflected light exits the receiving reflective lens through a third side of the reflective lens toward the light sensor.

* * * * *